United States Patent
Brianti et al.

(10) Patent No.: US 12,051,111 B2
(45) Date of Patent: *Jul. 30, 2024

(54) LEAN LEVEL SUPPORT FOR TRADING STRATEGIES

(71) Applicant: TRADING TECHNOLOGIES INTERNATIONAL INC., Chicago, IL (US)

(72) Inventors: Stephan Brianti, Monaco (MC); Sagy Pundak Mintz, Tampa, FL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,446

(22) Filed: May 4, 2022

(65) Prior Publication Data

US 2022/0261909 A1    Aug. 18, 2022

Related U.S. Application Data

(63) Continuation of application No. 17/081,553, filed on Oct. 27, 2020, which is a continuation of application
(Continued)

(51) Int. Cl.
*G06Q 40/04*      (2012.01)
*G06Q 40/06*      (2012.01)

(52) U.S. Cl.
CPC ............. *G06Q 40/04* (2013.01); *G06Q 40/06* (2013.01)

(58) Field of Classification Search
None
See application file for complete search history.

(56) References Cited

U.S. PATENT DOCUMENTS

| 4,588,192 A | 5/1986 | Laborde |
| 4,674,044 A | 6/1987 | Kalmus et al. |

(Continued)

FOREIGN PATENT DOCUMENTS

| CA | 2448974 A | 12/2002 |
| EP | 1067471 A1 | 1/2001 |

(Continued)

OTHER PUBLICATIONS

Hendershott, Terrence J. and Jones, Charles M. and Menkveld, Albert J., Does Algorithmic Trading Improve Liquidity? (Aug. 30, 2010). Journal of Finance, vol. 66, pp. 1-33, WFA 2008 Paper, Available at SSRN: https://ssrn.com/abstract=1100635 (Liquidity). (Year: 2010).*

(Continued)

*Primary Examiner* — Chikaodinaka Ojiaku
(74) *Attorney, Agent, or Firm* — McDonnell Boehnen Hulbert & Berghoff LLP

(57) ABSTRACT

Certain embodiments of the present invention provide techniques for lean level support for a trading strategy. According to certain embodiments, the support for a price level under consideration as a lean level is determined based at least in part on quantity available at the price level. According to certain embodiments, the support for a price level under consideration as a lean level is determined based at least in part on quantity available at one or more other price levels. According to certain embodiments, the support for a price level under consideration as a lean level is determined based at least in part on the number of orders at one or more price levels. A lean level may then be determined based on the determined support. According to certain embodiments, a lean multiplier and/or a lean base are determined dynamically based on the determined support.

24 Claims, 7 Drawing Sheets

Related U.S. Application Data

No. 12/605,968, filed on Oct. 26, 2009, now Pat. No. 10,853,877.

(56) References Cited

U.S. PATENT DOCUMENTS

| | | | |
|---|---|---|---|
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. | |
| 5,297,032 A | 3/1994 | Trojan et al. | |
| 5,689,651 A | 11/1997 | Lozman | |
| 5,774,877 A | 6/1998 | Patterson, Jr. et al. | |
| 5,787,402 A | 7/1998 | Potter et al. | |
| 5,793,301 A | 8/1998 | Patterson, Jr. et al. | |
| 5,797,002 A | 8/1998 | Patterson, Jr. et al. | |
| 5,806,050 A | 9/1998 | Shinn et al. | |
| 5,845,266 A | 12/1998 | Lupien et al. | |
| 5,915,245 A | 6/1999 | Patterson, Jr. et al. | |
| 5,924,082 A | 7/1999 | Silverman et al. | |
| 5,924,083 A | 7/1999 | Silverman et al. | |
| 5,946,667 A | 8/1999 | Tull, Jr. et al. | |
| 5,963,923 A | 10/1999 | Garber | |
| 6,012,046 A | 1/2000 | Lupien et al. | |
| 6,014,643 A | 1/2000 | Minton | |
| 6,035,287 A | 3/2000 | Stallaert et al. | |
| 6,098,051 A | 8/2000 | Lupien et al. | |
| 6,131,087 A | 10/2000 | Luke et al. | |
| 6,134,535 A | 10/2000 | Belzberg | |
| 6,195,647 B1 | 2/2001 | Martyn et al. | |
| 6,272,474 B1 | 8/2001 | Garcia | |
| 6,278,982 B1 | 8/2001 | Korhammer et al. | |
| 6,282,521 B1 | 8/2001 | Howorka | |
| 6,321,212 B1 | 11/2001 | Lange | |
| 6,408,282 B1 | 6/2002 | Buist | |
| 6,418,419 B1 | 7/2002 | Nieboer et al. | |
| 6,519,574 B1 | 2/2003 | Wilton et al. | |
| 6,766,304 B2 | 7/2004 | Kemp, II et al. | |
| 6,772,132 B1 | 8/2004 | Kemp, II et al. | |
| 6,912,511 B1 | 6/2005 | Eliezer et al. | |
| 6,983,260 B2 | 1/2006 | Hummelgren | |
| 6,996,540 B1 | 2/2006 | May | |
| 7,039,610 B2 | 5/2006 | Morano et al. | |
| 7,110,974 B1 | 9/2006 | Rust | |
| 7,127,424 B2 | 10/2006 | Kemp, II et al. | |
| 7,177,833 B1 | 2/2007 | Marynowski et al. | |
| 7,194,434 B2 | 3/2007 | Piccioli | |
| 7,225,153 B2 | 5/2007 | Lange | |
| 7,243,083 B2 | 7/2007 | Burns et al. | |
| 7,305,361 B2 | 12/2007 | Otero et al. | |
| 7,389,264 B2 * | 6/2008 | Kemp, II | G06Q 40/04 |
| | | | 705/37 |
| 7,389,268 B1 | 6/2008 | Kemp, II et al. | |
| 7,409,367 B2 | 8/2008 | McGill et al. | |
| 7,412,415 B2 | 8/2008 | Waddell | |
| 7,418,416 B2 | 8/2008 | Guidi et al. | |
| 7,424,450 B2 | 9/2008 | Kemp, II et al. | |
| 7,437,325 B2 | 10/2008 | Kemp, II et al. | |
| 7,472,087 B2 | 12/2008 | Keith | |
| 7,496,535 B2 | 2/2009 | Otero et al. | |
| 7,542,940 B2 * | 6/2009 | Burns | G06Q 40/03 |
| | | | 705/37 |
| 7,603,308 B2 | 10/2009 | Gatto | |
| 7,644,027 B2 | 1/2010 | Keith | |
| 7,729,978 B2 * | 6/2010 | Mintz | G06Q 40/00 |
| | | | 705/37 |
| 7,813,995 B2 | 10/2010 | Burns et al. | |
| 7,882,007 B2 | 2/2011 | Keith | |
| 7,904,371 B2 | 3/2011 | Davidowitz et al. | |
| 7,908,199 B2 | 3/2011 | Neff et al. | |
| 8,015,097 B2 | 9/2011 | Lawrence | |
| 8,180,692 B2 | 5/2012 | Kemp, II et al. | |
| 8,214,280 B2 | 7/2012 | Singer et al. | |
| 8,239,314 B2 | 8/2012 | Burns et al. | |
| 8,401,959 B2 * | 3/2013 | Mintz | G06Q 40/06 |
| | | | 705/37 |
| 8,527,390 B1 * | 9/2013 | Mintz | G06Q 40/04 |
| | | | 705/37 |
| 8,527,399 B2 * | 9/2013 | Mintz | G06Q 40/00 |
| | | | 705/37 |
| 8,682,781 B1 * | 3/2014 | Messina | G06Q 40/04 |
| | | | 705/37 |
| 8,768,806 B2 | 7/2014 | Kemp, II et al. | |
| 9,767,514 B2 * | 9/2017 | Lee | G06Q 40/02 |
| 9,972,049 B2 | 5/2018 | Kemp, II et al. | |
| 10,453,138 B2 | 10/2019 | Kemp, II et al. | |
| 10,489,855 B1 * | 11/2019 | Mecane | G06Q 40/04 |
| 10,699,341 B2 | 6/2020 | Kemp, II et al. | |
| 10,853,877 B2 | 12/2020 | Brianti et al. | |
| 10,902,518 B2 | 1/2021 | Kemp, II et al. | |
| 11,210,683 B2 * | 12/2021 | Lustyk | G06Q 30/0201 |
| 2001/0042040 A1 | 11/2001 | Keith | |
| 2001/0044770 A1 | 11/2001 | Keith | |
| 2001/0049651 A1 | 12/2001 | Selleck | |
| 2001/0051909 A1 | 12/2001 | Keith | |
| 2002/0002520 A1 | 1/2002 | Gatto | |
| 2002/0013756 A1 | 1/2002 | Piccioli | |
| 2002/0023038 A1 | 2/2002 | Fritsch et al. | |
| 2002/0046146 A1 | 4/2002 | Otero et al. | |
| 2002/0046149 A1 | 4/2002 | Otero et al. | |
| 2002/0046151 A1 | 4/2002 | Otero et al. | |
| 2002/0046156 A1 | 4/2002 | Horn et al. | |
| 2002/0049661 A1 | 4/2002 | Otero et al. | |
| 2002/0055899 A1 | 5/2002 | Williams | |
| 2002/0059129 A1 | 5/2002 | Kemp et al. | |
| 2002/0091617 A1 | 7/2002 | Keith | |
| 2002/0099644 A1 | 7/2002 | Kemp, II et al. | |
| 2002/0128950 A1 | 9/2002 | Wu et al. | |
| 2002/0138401 A1 | 9/2002 | Allen et al. | |
| 2002/0188549 A1 | 12/2002 | Nordlicht | |
| 2002/0188555 A1 | 12/2002 | Lawrence | |
| 2002/0194115 A1 | 12/2002 | Nordlicht et al. | |
| 2003/0004852 A1 | 1/2003 | Burns | |
| 2003/0004853 A1 | 1/2003 | Ram et al. | |
| 2003/0009411 A1 | 1/2003 | Ram et al. | |
| 2003/0014351 A1 | 1/2003 | Neff et al. | |
| 2003/0023542 A1 | 1/2003 | Kemp, II et al. | |
| 2003/0033235 A1 | 2/2003 | Hummelgren | |
| 2003/0069830 A1 | 4/2003 | Morano et al. | |
| 2003/0101125 A1 | 5/2003 | McGill et al. | |
| 2003/0130929 A1 | 7/2003 | Waddell | |
| 2003/0154152 A1 | 8/2003 | Gilbert et al. | |
| 2003/0200167 A1 * | 10/2003 | Kemp, II | G06Q 40/04 |
| | | | 705/37 |
| 2004/0103127 A1 | 5/2004 | Bjornson et al. | |
| 2004/0111352 A1 | 6/2004 | Kim | |
| 2004/0267655 A1 * | 12/2004 | Davidowitz | G06Q 40/00 |
| | | | 705/37 |
| 2005/0154668 A1 | 7/2005 | Burns et al. | |
| 2005/0165669 A1 | 7/2005 | Montanaro et al. | |
| 2006/0259406 A1 | 11/2006 | Kemp, II et al. | |
| 2006/0259409 A1 | 11/2006 | Burns et al. | |
| 2006/0259412 A1 | 11/2006 | Kemp, II et al. | |
| 2008/0243709 A1 * | 10/2008 | Mintz | G06Q 40/00 |
| | | | 705/37 |
| 2008/0288391 A1 * | 11/2008 | Downs | G06Q 40/04 |
| | | | 705/37 |
| 2009/0006244 A1 | 1/2009 | Kemp, II et al. | |
| 2009/0164389 A1 | 6/2009 | Finn | |
| 2009/0192933 A1 | 7/2009 | Singer et al. | |
| 2009/0228400 A1 | 9/2009 | Burns et al. | |
| 2010/0166330 A1 | 7/2010 | Thyagarajan et al. | |
| 2010/0198747 A1 * | 8/2010 | Mintz | G06Q 40/04 |
| | | | 705/37 |
| 2011/0040668 A1 | 2/2011 | Lee et al. | |
| 2011/0040669 A1 | 2/2011 | Lee et al. | |
| 2011/0078064 A1 * | 3/2011 | Messina | G06Q 40/04 |
| | | | 705/37 |

(56) References Cited

U.S. PATENT DOCUMENTS

| | | | |
|---|---|---|---|
| 2011/0099124 A1* | 4/2011 | Brianti | G06Q 40/06 705/36 R |
| 2011/0145124 A1* | 6/2011 | Rooney | B65D 25/04 705/37 |
| 2011/0145126 A1* | 6/2011 | Rooney | G06Q 40/04 705/37 |
| 2011/0313910 A1* | 12/2011 | Mintz | G06Q 40/00 705/37 |
| 2012/0016786 A1* | 1/2012 | Mintz | G06Q 40/04 705/37 |
| 2012/0166330 A1 | 6/2012 | Kemp, II et al. | |
| 2012/0203685 A1* | 8/2012 | Mintz | G06Q 40/04 705/37 |
| 2012/0271754 A1 | 10/2012 | Burns et al. | |
| 2013/0151393 A1* | 6/2013 | Mintz | G06Q 40/04 705/37 |
| 2014/0095365 A1* | 4/2014 | Potekhina | G06Q 40/04 705/37 |
| 2014/0122314 A1* | 5/2014 | Gottemoller | G06Q 40/04 705/37 |
| 2014/0136384 A1* | 5/2014 | Messina | G06Q 40/04 705/37 |
| 2015/0019397 A1* | 1/2015 | Buck | G06Q 40/04 705/37 |
| 2016/0078539 A1* | 3/2016 | Ignatovich | G06Q 40/04 705/37 |
| 2016/0275607 A1* | 9/2016 | Singer | G06Q 40/04 |
| 2016/0292785 A1* | 10/2016 | Cunnick | G06Q 40/04 |
| 2016/0292786 A1* | 10/2016 | Khizhnyak | G06Q 40/04 |
| 2017/0024651 A1* | 1/2017 | Mishra | G06Q 30/0201 |
| 2017/0039640 A1* | 2/2017 | Singer | G06Q 40/04 |
| 2017/0039642 A1* | 2/2017 | Brookfield | G06Q 40/04 |
| 2017/0178233 A1* | 6/2017 | Singer | G06Q 40/04 |
| 2017/0193600 A1* | 7/2017 | Mangutov | G06Q 40/04 |
| 2017/0193601 A1* | 7/2017 | Mangutov | G06Q 40/04 |
| 2017/0293973 A1* | 10/2017 | Lustyk | G06Q 30/0201 |
| 2017/0293974 A1* | 10/2017 | Konduru | G06Q 40/06 |
| 2018/0047099 A1* | 2/2018 | Bonig | G06Q 10/1093 |
| 2018/0047100 A1* | 2/2018 | Bonig | G06F 9/30043 |
| 2018/0075530 A1* | 3/2018 | Kavanagh | G06F 12/0646 |
| 2018/0183901 A1* | 6/2018 | Lariviere | H04L 47/10 |
| 2019/0005582 A1* | 1/2019 | Kapur | G06Q 40/04 |
| 2020/0311816 A1* | 10/2020 | Calvin | G06Q 20/065 |
| 2021/0056632 A1 | 2/2021 | Brianti et al. | |
| 2021/0103985 A1 | 4/2021 | Kemp, II et al. | |

FOREIGN PATENT DOCUMENTS

| | | |
|---|---|---|
| EP | 1104904 A1 | 6/2001 |
| EP | 1217564 A2 | 6/2002 |
| EP | 1217564 A3 | 7/2002 |
| EP | 1246111 A2 | 10/2002 |
| EP | 1246111 A3 | 3/2004 |
| JP | 2007-188486 A | 7/2007 |
| JP | 2008-541310 A | 11/2008 |
| JP | 2009-080836 A | 4/2009 |
| WO | 91/14231 A1 | 9/1991 |
| WO | 95/26005 A1 | 9/1995 |
| WO | 97/022072 A1 | 6/1997 |
| WO | 98/49639 A1 | 11/1998 |
| WO | 99/19821 A1 | 4/1999 |
| WO | 99/30259 A1 | 6/1999 |
| WO | 99/53424 A1 | 10/1999 |
| WO | 00/51043 A1 | 8/2000 |
| WO | 00/52619 A1 | 9/2000 |
| WO | 00/62187 A2 | 10/2000 |
| WO | 00/65510 A1 | 11/2000 |
| WO | 01/009757 A2 | 2/2001 |
| WO | 01/16830 A1 | 3/2001 |
| WO | 01/16852 A2 | 3/2001 |
| WO | 01/22266 A2 | 3/2001 |
| WO | 01/22315 A2 | 3/2001 |
| WO | 01/50378 A2 | 7/2001 |
| WO | 01/65403 A2 | 9/2001 |
| WO | 01/88808 A1 | 11/2001 |
| WO | 00/62187 A3 | 12/2001 |
| WO | 01/22315 A3 | 1/2002 |
| WO | 02/29686 A1 | 4/2002 |
| WO | 02/33621 A1 | 4/2002 |
| WO | 02/33623 A1 | 4/2002 |
| WO | 02/33635 A1 | 4/2002 |
| WO | 02/33636 A1 | 4/2002 |
| WO | 02/33637 A1 | 4/2002 |
| WO | 01/16852 A8 | 6/2002 |
| WO | 02/47006 A1 | 6/2002 |
| WO | 02/79940 A2 | 10/2002 |
| WO | 02/80433 A2 | 10/2002 |
| WO | 02/97580 A2 | 12/2002 |
| WO | 02/103601 A1 | 12/2002 |
| WO | 03/090032 A2 | 10/2003 |
| WO | 03/090032 A3 | 12/2003 |
| WO | 2006/127415 A2 | 11/2006 |

OTHER PUBLICATIONS

Terrence Hendershott, Charles M. Jones, and Albert J. Menkveld, Does Algorithmic Trading Improve Liquidity? The Journal of Finance • vol. LXVI, No. 1 • Feb. 2011 (Journal of Finance). (Year: 2011).*

Chan, K., et al., "The Intraday Behavior of Bid-Ask Spreads for NYSE Stocks and CBOE Options," *The Journal of Financial and Quantitative Analysis*, Sep. 1995, vol. 30, No. 3, pp. 329-346.

Clark, R.A., et al., "Seasonalities in NYSE Bid-Ask Spreads and Stock Returns in January," *The Journal of Finance*, vol. 47, No. 5, Dec. 1992, pp. 1999-2014.

Eric K. Clemons & Bruce W. Weber (1998) Restructuring Institutional Block Trading an Overview of the Opti Mark System, Journal of Management Information Systems, 15:2, 41-60, (Block Trading). (Year: 1998).

Extended European Search Report in European Patent Application No. 11158926.3 dated Sep. 13, 2011 mailed Sep. 22, 2011.

George, T.J. and F.A. Longstaff, "Bid-Ask Spreads and Trading Activity in the S&P 100 Index Options Market," *The Journal of Financial and Quantitative Analysis*, vol. 28, No. 3, Sep. 1993, pp. 381-397.

Hendershott, T., et al., "Does Algorithmic Trading Improve Liquidity?" The Journal of Finance, vol. LXVI, No. 1, Feb. 2011.

International Search Report of International Application No. PCT/US2003/006445, dated May 1, 2003 (mailed Aug. 28, 2003).

International Search Report and Written Opinion of International Application No. PCT/US2005/009180 dated Feb. 5, 2007 (mailed May 8, 2007).

International Search Report and Written Opinion of International Application No. PCT/US2010/053019, dated Mar. 11, 2011 (mailed Mar. 29, 2011).

Kharouf, J. and Cavaletti, C. "A Trading Room with a View," *Futures*, vol. 27, Nov. 1998, pp. 66-71.

Luo, W-C., "Spread Arbitrage Between Stock Index Futures in Taiwan A Cointegration Approach," Department of Economics, University of Southampton, Nov. 14, 2002, pp. 1-42.

McInish, T.H. and R.A. Wood, "An Analysis of Intraday Patters in Bid/Ask Spreads for NYSE Stocks," *The Journal of Finance*, vol. 47, No. 2, Jun. 1992, pp. 753-764.

MTS News, No. 5, Mar. 2002, pp. 1-8.

USPTO Presentation, NASDAQ, Nov. 8, 2001, 15 pages.

Written Opinion of Singapore Patent Application No. 201202877-5 dated May 5, 2013 mailed May 8, 2013.

X_Trader Product HTML Page [online], Trading Technologies International, Inc., Jun. 9, 2000. [Retrieved on Mar. 22, 2001] from the Internet: www.tradingtechnologies.com/products/xtrade_full.html.

* cited by examiner

| ES DEC 09 | | | | | |
|---|---|---|---|---|---|
| 11:25:15 | E/W | BidQ | Prc | AskQ | LTQ |
| -25 | | | 99950 | 917 | |
| 956224 | | | 99925 | 1042 | |
| -2 | | | 99900 | 1124 | |
| 5 | | | 99875 | 1262 | |
| 1    5 | | | 99850 | 1050 | |
| 10   20 | S 2 W 3 | | 99825 | 1171 | |
| 50   100 | | | 99800 | 1142 | |
| CLR | | | 99775 | 1054 | |
| 1 | | | 99750 | 336 | 42 |
| SL   SM | | 271 | 99725 | | |
| | B 0 W 10 | 986 | 99700 | | |
| Del All | | 1299 | 99675 | | |
| Delete 3 | | 1111 | 99650 | | |
| Delete 10 | | 1316 | 99625 | | |
| | | 962 | 99600 | | |
| | | 1062 | 99575 | | |
| | | 1024 | 99550 | | |
| | | 942 | 99525 | | |
| | | 817 | 99500 | | |

LEAN LEVEL SUPPORT FOR TRADING STRATEGIES

CROSS REFERENCE TO RELATED APPLICATIONS

The present application is a continuation of U.S. patent application Ser. No. 17/081,553, filed Oct. 27, 2020, now U.S. Pat. No. 11,373,241, which is a continuation of U.S. patent application Ser. No. 12/605,968, filed Oct. 26, 2009, now U.S. Pat. No. 10,853,877, the entire contents of each of which is herewith incorporated by reference into the present application for all purposes.

BACKGROUND

The present invention is directed towards electronic trading systems. More particularly, certain embodiments of the present invention are directed towards lean level support for trading strategies in electronic trading systems.

An electronic trading system provides for electronically matching orders to buy and sell items to be traded. The items may include, for example, stocks, options, futures contracts, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices.

In addition to trading single items, a trader may trade more than one item according to a trading strategy. One common trading strategy is a spread and trading according to a trading strategy may also be referred to as spread trading. Spread trading may attempt to capitalize on changes or movements in the relationships between the items in the trading strategy, for example.

A trading strategy may define a relationship between two or more items to be traded. Each item in a trading strategy may be referred to as a leg of the trading strategy. Once defined, items in the trading strategy may then be traded together according to the defined relationship.

Generally, a trader determines a desired price at which to buy or sell a particular trading strategy. Then, an automated trading tool, for example, attempts to achieve that desired price by buying and selling the legs at appropriate prices. For example, when a trader instructs the trading tool to buy or sell a trading strategy at a desired price, an automated trading tool may automatically place an order for one tradeable object to achieve the desired price for the trading strategy. The leg for which the order is placed may be referred to as the quoting leg. The other leg may be referred to as a lean leg and/or a hedge leg. The price that the quoting leg is quoted at is based on a target price that an order could be filled at in the lean leg. The target price in the lean leg is also known as the leaned on price, lean price, or lean level. Typically, if there is sufficient quantity available, the target price may be the best bid price when selling and the best ask price when buying. As the leaned on price changes, the price for the order in the quoting leg may also change to maintain the desired strategy price.

When the quoting leg is filled, the automated trading tool may then submit an order in the hedge leg to complete the strategy. This order may be referred to as an offsetting or hedging order and is typically quoted at the leaned on price.

If the order at the leaned on price is not filled (or filled sufficiently to achieve the desired strategy price), then the trader is said to be "legged up" or "legged" because the trader has not achieved the desired strategy relationship according to the trading strategy definition.

Current systems provide various techniques to determine a lean level to reduce the likelihood of being legged. There may be risks associated with a particular lean level not accounted for by these current techniques.

SUMMARY

Certain embodiments of the present invention provide techniques for lean level support for a trading strategy. According to certain embodiments, the support for a price level under consideration as a lean level is determined based at least in part on quantity available at the price level. According to certain embodiments, the support for a price level under consideration as a lean level is determined based at least in part on quantity available at one or more other price levels. According to certain embodiments, the support for a price level under consideration as a lean level is determined based at least in part on the number of orders at one or more price levels. A lean level may then be determined based on the determined support. According to certain embodiments, a lean multiplier and/or a lean base are determined dynamically based on the determined support.

Certain embodiments of the present invention provide a method for trading in an electronic trading environment including receiving a definition for a trading strategy, wherein the trading strategy includes a first tradeable object and a second tradeable object; receiving market data for the first tradeable object and the second tradeable object, wherein the market data for the second tradeable object includes information about quantity available at each of a plurality of price levels for the second tradeable object; receiving a desired strategy price; determining a support value for a first price level of the plurality of price levels for the second tradeable object based on the market data for the second tradeable object; determining a lean level based on the determined support value; and placing a first order for the first tradeable object at a first price, wherein the first price is based on the definition for the trading strategy and the desired strategy price and the determined lean level.

Certain embodiments of the present invention provide a system for trading in an electronic trading environment including a market data processing component, a strategy processing component, and a lean level support processing component. The strategy processing component is adapted to receive a definition for a trading strategy, wherein the trading strategy includes a first tradeable object and a second tradeable object. The market data processing component is adapted to receive market data for the first tradeable object and the second tradeable object, wherein the market data for the second tradeable object includes information about quantity available at each of a plurality of price levels for the second tradeable object. The strategy processing component is adapted to receive a desired strategy price. The lean level support processing component is adapted to determine a support value for a first price level of the plurality of price levels for the second tradeable object based on the market data for the second tradeable object. The strategy processing component is adapted to determine a lean level based on the determined support value. The strategy processing component is adapted to place a first order for the first tradeable object at a first price, wherein the first price is based on the definition for the trading strategy and the desired strategy price and the determined lean level.

Other embodiments of the present invention are described below. In addition, modifications may be made to the described embodiments without departing from the spirit or scope of the invention.

BRIEF DESCRIPTION OF THE DRAWINGS

Example embodiments are described herein with reference to the following drawings.

FIG. 4 illustrates a trading interface for trading in an electronic trading system in which certain embodiments of the present invention may be employed.

Figure 1:
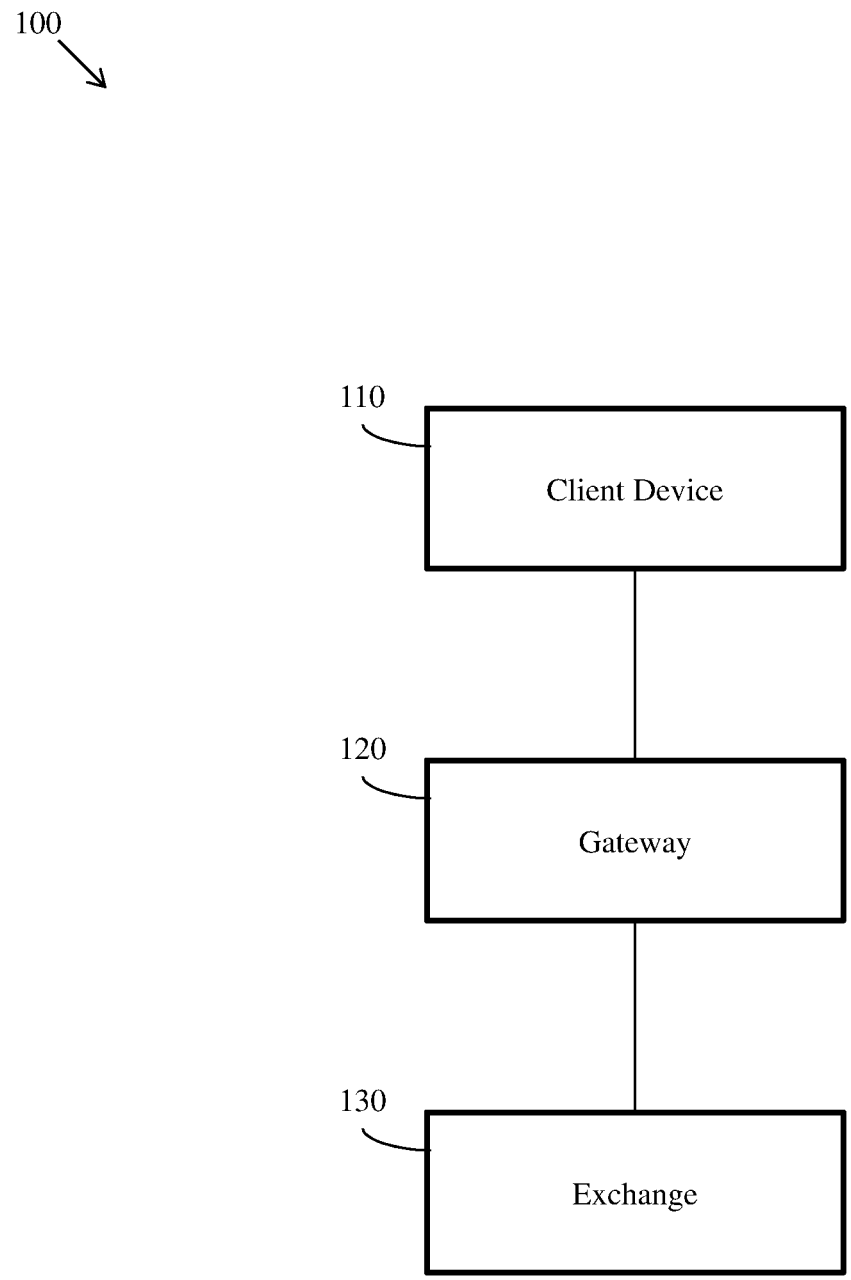
FIG. 1 illustrates a block diagram of an electronic trading system in which certain embodiments of the present invention may be employed.

The foregoing summary, as well as the following detailed description, will be better understood when read in conjunction with the drawings which show certain embodiments of the present invention. The drawings are for the purpose of illustrating certain embodiments, but it should be understood that the present invention is not limited to the arrangements and instrumentality shown in the drawings.

DETAILED DESCRIPTION

Certain embodiments of the present invention provide techniques for lean level support for a trading strategy. According to certain embodiments, the support for a price level under consideration as a lean level is determined based at least in part on quantity available at the price level. According to certain embodiments, the support for a price level under consideration as a lean level is determined based at least in part on quantity available at one or more other price levels. For example, one or more empty price levels and/or price levels with low quantity may be used to determine that a price level under consideration as a lean level has weak or no support. According to certain embodiments, the support for a price level under consideration as a lean level is determined based at least in part on the number of orders at one or more price levels. A lean level may then be determined based on the determined support. According to certain embodiments, a lean multiplier and/or a lean base are determined dynamically based on the determined support.

I. Example Electronic Trading System

FIG. 1 illustrates a block diagram of an electronic trading system 100 in which certain embodiments of the present invention may be employed. The system 100 includes a client device 110, a gateway 120, and an electronic exchange 130. The client device 110 is in communication with the gateway 120. The gateway 120 is in communication with the exchange 130.

In operation, the client device 110 may be utilized by a user to send orders to buy or sell tradeable objects at the exchange 130. The orders are sent through the gateway 120 to the exchange 130. In addition, market data is sent from the exchange 130 through the gateway 120 to the client device 110. The user may also utilize the client device 110 to monitor this market data and base a decision to send an order for a tradeable object on the market data.

A tradeable object is anything which can be traded with a quantity and/or a price. For example, financial products such as stocks, options, bonds, futures, currency, warrants, funds derivatives, commodities, traded events, goods, and collections and/or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread created by a trader utilizing a client device 110.

The client device 110 may include one or more electronic computing platforms such as a hand-held device, laptop, desktop computer, workstation with a single or multi-core processor, server with multiple processors, and/or cluster of computers, for example.

The client device 110 may include one or more trading applications. The trading application(s) may, for example, process market data by arranging and displaying the market data in trading and charting windows. This processing may be based on user preferences, for example. The trading application(s) may include an automated trading tool such as an automated spread trading tool, for example.

The client device 110 may include an electronic trading workstation, a portable trading device, an algorithmic trading or "black-box" system, an embedded trading system, and/or an automated trading tool, for example. For example, the client device 110 may be a computing system running a copy of X_TRADER™, an electronic trading platform provided by Trading Technologies International, Inc. of Chicago, Illinois. As another example, the client device 110 may be a computing device running the automated trading tool may Autospreader™, also provided by Trading Technologies International, Inc.

The client device 110 is adapted to send orders to buy or sell tradeable objects. The client device 110 may also be adapted to cancel orders, change orders, and/or query an exchange, for example.

The orders sent by the client device 110 may be sent at the request from a user or automatically, for example. For example, a trader may utilize an electronic trading workstation to place an order for a particular tradeable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the client device 110 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, the orders from the client device 110 are sent to the exchange 130 through the gateway 120. The client device 110 may communicate with the gateway 120 using a local area network, a wide area network, a virtual private network, a T1 line, a T3 line, an ISDN line, a point-of-presence, and/or the Internet, for example.

The gateway 120 is adapted to communicate with the client device 110 and the exchange 130. The gateway 120 facilitates communication between the client device 110 and the exchange 130. For example, the gateway 120 may receive orders from the client device 110 and transmit the orders to the exchange 130. As another example, the gateway 120 may receive market data from the exchange 130 and transmit the market data to the client device 110.

In certain embodiments, the gateway 120 performs processing on data communicated between the client device 110 and the exchange 130. For example, the gateway 120 may process an order received from the client device 110 into a data format acceptable by the exchange 130. Similarly, the gateway 120 may transform market data in an exchange-specific format received from the exchange 130 into a format understood by the client device 110. The processing of the gateway 120 may also include tracking orders from the client device 110 and updating the status of the order based on fill confirmations received from the exchange 130, for example. As another example, the gateway 120 may coalesce market data from the exchange 130 and provide it to the client device 120.

In certain embodiments, the gateway 120 provides services other than processing data communicated between the client device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, and/or the Internet, for example.

The exchange 130 is adapted to match orders to buy and sell tradeable objects. The tradeable objects may be listed for trading by the exchange 130. The orders may include orders received from the client device 110, for example. Orders may be received from the client device 110 through the gateway 120, for example. In addition, the orders may be received from other devices in communication with the exchange 130. That is, typically the exchange 130 will be in communication with a variety of other client devices (which may be similar to client device 110) that also provide orders to be matched.

The exchange 130 is adapted to provide market data. The market data may be provided to the client device 110, for example. The market data may be provided to the client device 110 through the gateway 120, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, the system 100 includes more than one client device 110. For example, multiple client devices similar to the client device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the client device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the client device 110 to trade at more than one exchange through the gateway 120, for example.

In certain embodiments, the client device 110 includes one or more computing devices or processing components. In other words, the functionality of the client device 110 may be performed by more than one computing device. For example, one computing device may generate orders to be sent to the exchange 130 while another computing device may provide a graphical user interface to a trader. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the client device 110. For example, the components of the gateway 120 may be part of the same computing platform as the client device 110. As another example, the functionality of the gateway 120 may be performed by components of the client device 110. In certain embodiments, the gateway 120 is not present. Such an arrangement may occur when the client device 110 does not need to utilize the gateway 120 to communicate with the exchange 130, for example. For example, if the client device 110 has been adapted to communicate directly with the exchange 130.

In certain embodiments, the gateway 120 is physically located at the same site as the client device 110. In certain embodiments, the gateway 120 is physically located at the same site as the exchange 130. In certain embodiments, the client device 110 is physically located at the same site as the exchange 130. In certain embodiments, the gateway 120 is physically located at a site separate from both the client device 110 and the exchange 130.

While not shown for the sake of clarity, in certain embodiments, the system 100 may include other devices that are specific to the communications architecture such as middleware, firewalls, hubs, switches, routers, exchange-specific communication equipment, modems, security managers, and/or encryption/decryption devices.

Figure 2:
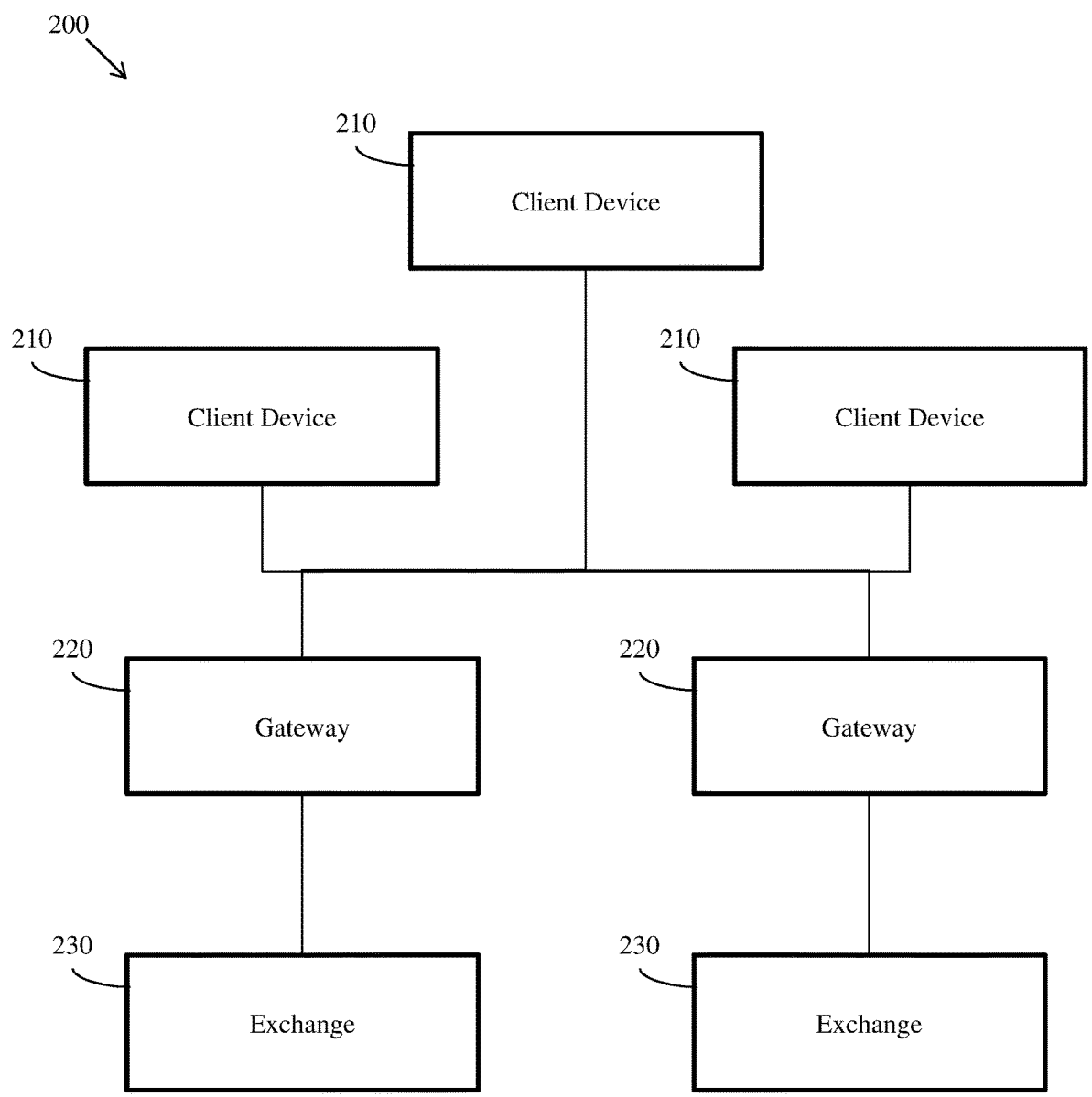
FIG. 2 illustrates a block diagram of an electronic trading system in which certain embodiments of the present invention may be employed.

FIG. 2 illustrates a block diagram of an electronic trading system 200 in which certain embodiments of the present invention may be employed. The system 200 includes one or more client devices 210, one or more gateways 220, and one or more electronic exchanges 230. The client devices 210 are in communication with one or more of the gateways 220. Each gateway 220 is in communication with a corresponding exchange 230.

One or more of the client devices 210 may be similar to the client device 110, discussed above, for example. One or more of the gateways 220 may be similar to the gateway 120, discussed above, for example. One or more of the exchanges 230 may be similar to the exchange 130, discussed above, for example.

In operation, a client device 210 may be utilized by a user to send orders to buy or sell tradeable objects listed at different exchanges 230. The orders are sent through one or more of the gateways 220 to one or more of the exchanges 230. In addition, market data is sent from the exchanges 230 through the gateways 220 to one or more of the client devices 210. The user may also utilize a client device 210 to monitor this market data and base a decision to send an order for a tradeable object on the market data.

In certain embodiments, a client device 210 is in communication with one of the gateways 220. In certain embodiments, a client device 210 is in communication with more than one of the exchanges 230.

In certain embodiments, a gateway 220 is in communication with one of the exchanges 230. In certain embodiments, a gateway 220 is in communication with more than one of the exchanges 230.

In certain embodiments, a client device 210 is adapted to communicate directly with one or more of the exchanges 230 and does not utilize a gateway 220.

The components, elements, and/or functionality of the systems 100 and/or 200 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

II. Strategy Trading

In addition to buying and/or selling a single tradeable object, a trader may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

A trader may utilize an automated trading tool to trade according to a trading strategy, for example. For example, the automated trading tool may Autospreader™ provided by Trading Technologies International, Inc. of Chicago, Illinois.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 3:
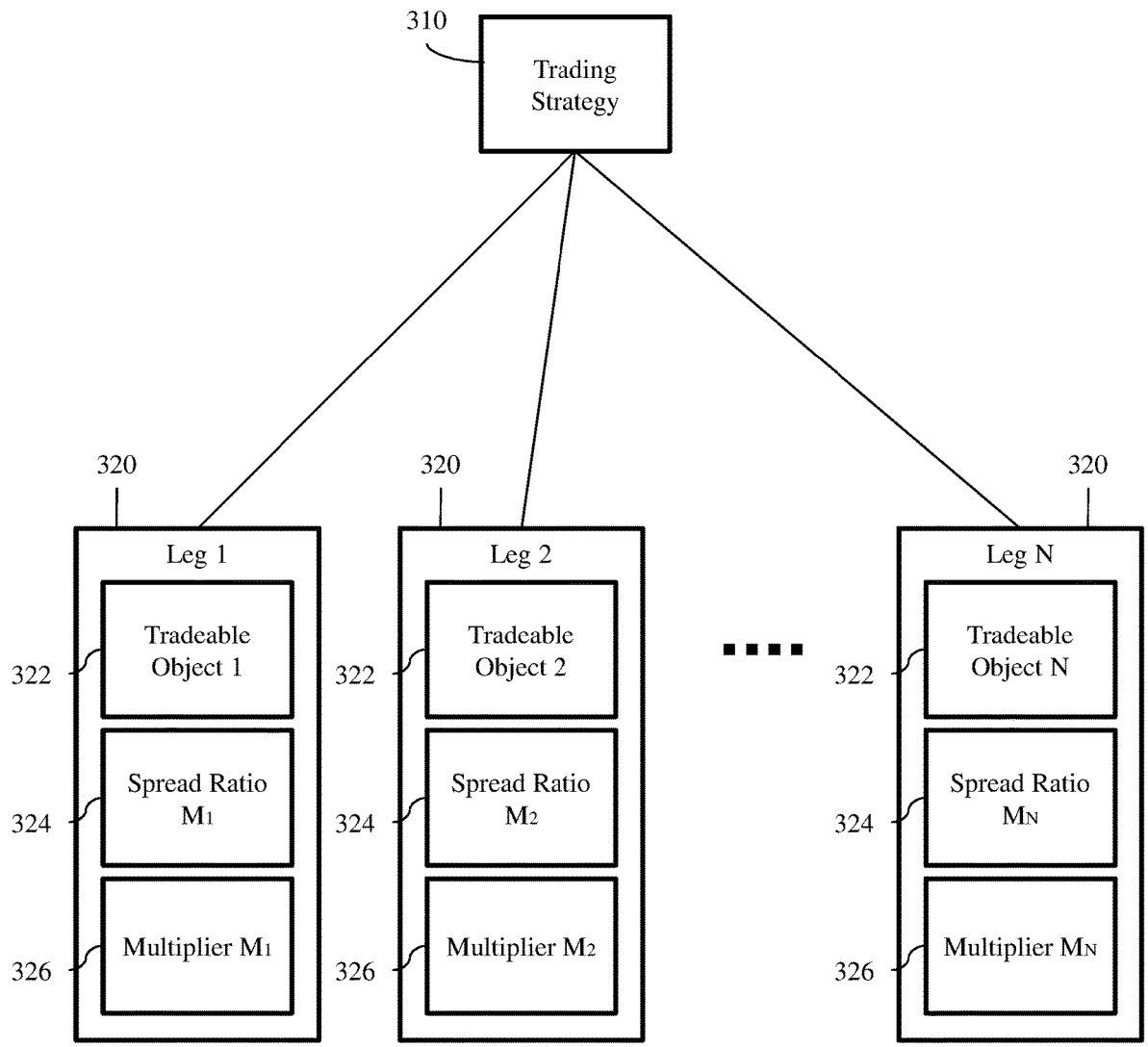
FIG. 3 illustrates a block diagram of a trading strategy which may be employed with certain embodiments of the present invention.

FIG. 3 illustrates a block diagram of a trading strategy 310 which may be employed with certain embodiments of the present invention. The trading strategy 310 includes "N" legs 320. The trading strategy 310 defines the relationship between the tradeable objects 322 for each of the legs 320 using the spread ratios 324 and multipliers 326 associated with each of the legs 320.

Once defined, the tradeable objects 322 in the trading strategy 310 may then be traded together according to the defined relationship. For example, assume that the trading strategy 310 is a spread with two legs 320. Leg 1 is for tradeable object A and Leg 2 is for tradeable object B. In addition, assume that the spread ratios 324 and multipliers 326 associated with Legs 1 and 2 are "1" and "4," respectively. That is, the spread 310 is defined such that when the spread 310 is bought, 1 unit of tradeable object A is bought (positive spread ratio, same direction as the spread) and 1 unit of tradeable object B is sold (negative spread ratio, opposite direction of the spread). As mentioned above, typically in spread trading the opposite of the definition applies. That is, when the definition for the spread 310 is such that when the spread 310 is sold, 1 unit of tradeable object A is sold (positive spread ratio, same direction as the spread) and 1 unit of tradeable object B is bought (negative spread ratio, opposite direction of the spread).

The price for the trading strategy 310 is determined based on the definition. In particular, the price for the trading strategy 310 is typically the sum of price of the tradeable object 322 multiplied by the multiplier 326 for each of the legs 320 of the trading strategy 310. The price for a trading strategy may be affected by price tick rounding and/or pay-up ticks. However, both of these implementation details are beyond the scope of this discussion and are well-known in the art.

The discussion above applies whether the example spread is real or synthetic. Recall that, as discussed above, a real spread would be listed at an exchange, such as exchange 130 and/or 230, as a tradeable product. In contrast, a synthetic spread would not be list as a product at an exchange, but rather the various legs of the spread are tradeable at one or more exchanges. For the purposes of the following discussion, the trading strategy 310 is discussed as a synthetic trading strategy. However, similar techniques to those discussed below may also be applied by an exchange when a real trading strategy is being traded.

Continuing the example from above, if a trader believes that tradeable object A typically has a price 10 greater than tradeable object B, then the trader may want to buy the spread whenever the difference in price between tradeable objects A and B is less than 10 and sell the spread whenever the difference is greater than 10. As an example, assume that tradeable object A is at a price of 45 and tradeable object B is at a price of 40. The current spread price may then be determined to be (1)(45)+(−1)(40)=5, which is less than the typical spread of 10. Thus, the trader may buy 1 unit of the spread, which results in buying 1 unit of tradeable object A at a price of 45 and selling 1 unit of tradeable object B at 40. At some later time, the typical price difference may be restored and the price of tradeable object A is 42 and the price of tradeable object B is 32. At this point, the price of the spread is now 10. If the trader sells 1 unit of the spread to close out his position (that is, sells 1 unit of tradeable object A and buys 1 unit of tradeable object B), he has made a profit on the total transaction. In particular, while the trader bought tradeable object A at a price of 45 and sold at 42, losing 3, the trader sold tradeable object B at a price of 40 and bought at 32, for a profit of 8. Thus, the trader made 5 on the buying and selling of the spread.

The above example assumes that there is sufficient liquidity and stability that the tradeable objects can be bought and sold at the market price at approximately the desired times. This allows the trader to achieve the desired price for the spread 310. However, more generally, a trader determines a desired price at which to buy or sell a particular trading strategy. Then, an automated trading tool, for example, attempts to achieve that desired price by buying and selling the legs at appropriate prices. For example, when a trader instructs the trading tool to buy or sell the trading strategy 310 at a desired price, the automated trading tool may automatically place an order (also referred to as quoting an order) for one of the tradeable objects 322 of the trading strategy 310 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

When the quoting leg is filled, the automated trading tool may then submit an order in the hedge leg to complete the strategy. This order may be referred to as an offsetting or hedging order and is typically quoted at the leaned on price. If the order at the leaned on price is not filled (or filled sufficiently to achieve the desired strategy price), then the trader is said to be "legged up" or "legged" because the trader has not achieved the desired strategy relationship according to the trading strategy definition.

Also, depending on the trading strategy, the price of a quoted leg may be based on less than all of the other legs, for example. As another example, the order parameters of an order in a quoted leg may lean on other types of market conditions in the other legs such as the last traded price (LTP), the last traded quantity (LTQ), a theoretical value, multiple quantities such as quantities closer to the inside market, or some other reference point.

In addition to having a single quoting leg, as discussed above, a trading strategy may be quoted in multiple (or even all) legs. In such situations, each quoted leg still leans on the other legs. When one of the quoted legs is filled, the orders in the other quoted legs are typically cancelled and then appropriate hedge orders are placed based on the leaned on prices that the filled leg was based on.

III. Current Techniques for Determining a Lean Level for a Trading Strategy

When buying and selling trading strategies, traders generally desire to achieve a target price for the trading strategy. That is, traders want to buy and/or sell (according to the definition of the trading strategy) the tradeable objects for the legs of the trading strategy so as to result in a particular strategy price being realized. The strategy price is desired because traders using trading strategies may be concerned with achieving the price for the relationship rather than obtaining a particular price for the underlying tradeable objects.

For example, if a trader believes that platinum is worth $100 more than gold, the trader would be willing to sell gold for $750 and buy platinum at $800. The trader would be just as willing to sell gold at $950 and buy platinum at $1000. In both cases, the trader is buying the platinum-gold spread at $50 when the trader believes the spread can later be sold for $100. A spread trader is interested in the difference in price between platinum and gold, and the price of each by itself is not meaningful in such a strategy.

As discussed above, the price that the quoting leg is quoted at is based on a lean level in the lean leg. Current systems provide various techniques to determine a lean level. A typical technique to determine the lean level for a quoting leg is to use the best bid price when selling in the hedge leg and the best ask price when buying in the hedge leg. For example, if a hedge quantity of 10 needs to be bought, the lean level may be the best ask price in the lean leg. Such a technique may select the best bid/ask price regardless of whether sufficient quantity is available. As another example, the lean level may be determined to be the first price level with sufficient quantity available. Other techniques to determine a lean level may include, for example, a predefined number of levels into the depth, a predefined number of ticks away from the inside market, a predefined number of ticks into the market, or weighted averages. Current techniques may (or may not) include implied prices in determining the lean level.

FIG. 4 illustrates a trading interface 400 for trading in an electronic trading system in which certain embodiments of the present invention may be employed. The trading interface 400 includes a price column 410, a bid quantity column 420, and an ask quantity column 430. The price column 410 includes price levels. The bid quantity column 420 includes bid quantity indicators. The ask quantity column 430 includes ask quantity indicators. The bid quantity indicators and ask quantity indicators are aligned with the corresponding price level of the price column 410. The inside market 440 includes the best bid price and the best ask price.

Current systems may utilize various protective mechanisms to reduce the likelihood of being legged. These protective mechanisms may be part of the technique for determining a lean level, for example.

Current techniques may consider whether sufficient quantity is available when determining a lean level, for example. If sufficient quantity is not available at the inside market, for example, quantity available at subsequent price levels away from the inside market may be considered until sufficient quantity is found.

For example, consider a case where a hedge quantity of 10 needs to be bought. An automated trading tool might first look at the best ask price in the hedge leg as the lean level. However, if the quantity available at the best ask price is only 3, a trader may not want to lean on that price because, if the quoting leg is filled, a hedge order placed at the best ask price will likely leave the trader legged (because only 3 of the needed quantity of 10 will be filled). The automated trading tool utilizing such a protective mechanism might then consider the quantity available at each subsequent price level away from the best ask price (that is, at higher prices) until sufficient quantity is found to meet the needed quantity of 10. Continuing the example, if one price level away from the best ask price has a quantity of 7 or more available, then the lean level for the quoting leg may be determined to be the price one level away from the best ask price. In this case, when the hedge order is placed, sufficient quantity should be available across the two price levels (3 from the best ask price level and 7 from one price level away from the best ask price level) to meet the needed quantity of 10. In such a situation, the lean price may be determined to be the "worst" price needed or a weighted average of the quantities and price levels leaned on, for example.

As another example, with respect to FIG. 4, consider a case where a hedge quantity of 500 needs to be sold. The inside market 440 has 271 quantity available at the best bid price (99725). This is not enough quantity to satisfy an order for 500, so the next price level away from the inside market (99700) is considered. This price level has 986 quantity available, so between the two price levels (99725 and 99700), there is 1257 quantity available, which is enough to satisfy the 500 quantity needed. In this case, the lean level may be determined to be the "worst" price of 99700 or a weighted average price of (271/500)(99725)+(229/500)(99700)=99713.55 may be used.

Current techniques may utilize a lean multiplier, for example. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. As another example, with respect to FIG. 4, consider a case where a quantity of 100 needs to be sold and the lean multiplier is 3. In this case, a quantity of 300 should be available at the lean price to satisfy the lean multiplier. However, the best bid price (99725) of the inside market 440 has only a quantity of 271 available. Thus, the next price level away from the best bid price is considered. This price level (99700) has a quantity of 986 available, which is enough to satisfy the lean multiplier quantity requirement, so it may be used as the lean level.

Current techniques may utilize a lean base, for example. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. As another example, with respect to FIG. 4, consider a case where a quantity of 300 needs to be bought and the lean base is 50. In this case, a quantity of 350 should be available at the lean price to satisfy the lean base. However, the best ask price (99750) of the inside market 440 has only a quantity of 336 available. Thus, the next price level away from the best ask price is considered. This price level (99775) has a quantity of 1054 available, which is enough to satisfy the lean base quantity requirement, so it may be used as the lean level.

These techniques may also be used in combination, for example. For example, when a lean base or lean multiplier is specified, the additional quantity to satisfy the lean base/lean multiplier may be found across multiple price levels. Consider as an example, a lean multiplier of 2, where a quantity of 10 is needed in the hedge leg. The lean level may be determined to be the weighted average of the price levels, starting from the inside market through the subsequent price levels away from the inside market, until the total quantity of 20 is available.

As another example, both a lean base and a lean multiplier may be specified. The lean base and lean multiplier may be utilized such that larger of the two is used or they may be used additively to determine the amount of quantity to be available, for example. Consider as an example, a lean multiplier of 2 and a lean base of 5, where a quantity of 2 is needed in the hedge leg. When the larger of the two is used, then the lean level may be determined to be the price that has at least a quantity of 5 available because the lean base of 5 is larger than quantity of 2 multiplied by lean multiplier of 2. If the lean base and the lean multiplier are used additively then, in this example, the lean level may be determined to be the price that has at least a quantity of 9 available.

IV. Techniques for Lean Level Support for a Trading Strategy

A. Additional Risks in Sparse Markets

The tradeable object being traded with the trading interface 400 may be considered to be in a "tight" market. For example, there are no gaps in the quantity available at each price level, the quantity available is relatively large at most price levels compared to the typical order size, and the bid-ask spread is small (here, 0 Ticks). In such a market, current techniques may perform satisfactorily and traders may not be taking on additional risks of being legged.

For example, assume a quantity of 100 needs to be bought in the hedge leg. A current technique may simply use the best bid price as the lean level because the quantity available at the best bid price is more than double the needed quantity. The risk of leaning on the best bid price in this case may be low because there is more than double the needed quantity, so it is likely that sufficient quantity will be available even if a portion of the quantity goes away (for example, because orders are matched or cancelled).

In addition, the risk of leaning on the best bid price in this case may be low because there is more quantity available just one tick away from the best bid price. Therefore, even if the quantity at the leaned on best bid price is insufficient when the hedge order is placed, there will very likely be sufficient quantity one tick away. In this case, while a trader may not get all of the quantity desired at the lean price, it is likely that the needed quantity will be available within one tick of the lean price.

Further, the risk of leaning on the best bid price in this case may be low because the quantity available at each price level is likely made up of numerous orders. Therefore, it is unlikely that much of the quantity available at a particular price level will go away because the multiple orders making up the quantity are likely from different traders who are unlikely to all cancel their orders at the same time.

For at least these reasons, there is little risk to the trader to lean on the best bid price in the tight market depicted in FIG. 4 because of the available quantity at both the leaned on price and the adjacent prices and the likelihood that such quantity will be available when a hedge order needs to be placed.

Thus, current techniques may be generally satisfactory in some types of markets.

However, under certain market conditions, utilizing a particular lean level may increase the chance of being legged more than a trader may appreciate or be willing to bear. This is the case even though a particular leaned on quantity satisfies the needed quantity requirements and any additional quantity specified (for example, by a lean base and/or a lean multiplier) with current techniques.

Figure 5:
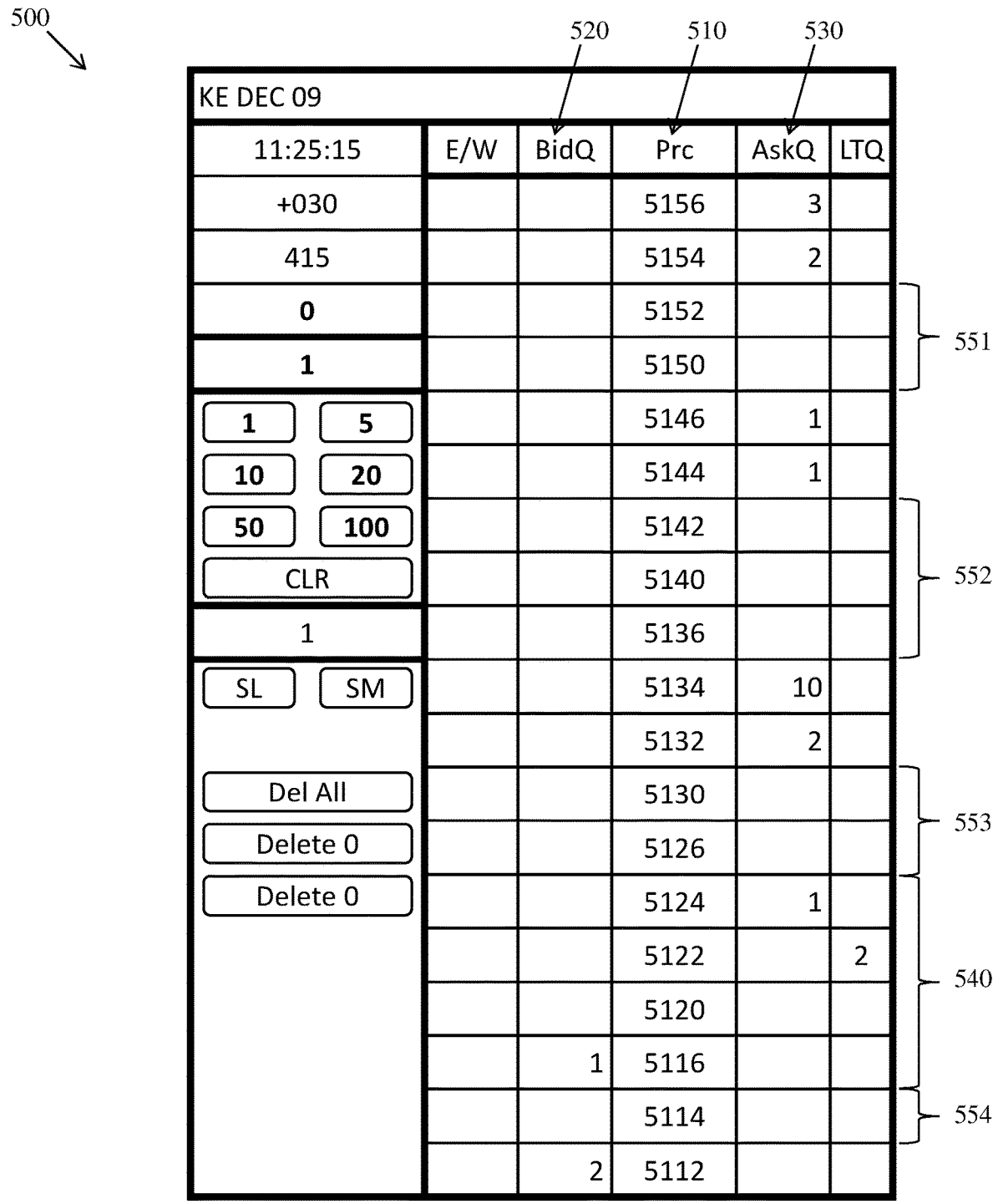
FIG. 5 illustrates a trading interface for trading in an electronic trading system in which certain embodiments of the present invention may be employed.

FIG. 5 illustrates a trading interface 500 for trading in an electronic trading system in which certain embodiments of the present invention may be employed. The trading interface 500 may be similar to the trading interface 400, discussed above, for example. The trading interface 500 includes a price column 510, a bid quantity column 520, and an ask quantity column 530. The price column 510 includes price levels. The bid quantity column 520 includes bid quantity indicators. The ask quantity column 530 includes ask quantity indicators. The bid quantity indicators and ask quantity indicators are aligned with the corresponding price level of the price column 510. The inside market 540 includes the best bid price and the best ask price.

The tradeable object being traded with the trading interface 500 may be considered to be in a "sparse" market. For example, many price levels do not have any quantity available, resulting in gaps in the quantity available at various price levels, such as gaps 551, 552, 553, and 554. In addition, the quantity available at many price levels is small, possibly being comprised of only a single order. Also, new quantity may become available infrequently, with new orders being placed only occasionally and for small quantities. In such a market, current techniques may expose a trader to unexpected risk.

For example, if there are gaps in the quantity available at various price levels, leaning on a price (such as the best ask price 5124) that is followed by a gap (such as gap 553) may lead to significant losses. This is because, if the leaned on quantity were to become unavailable before a hedge order was filled, the next price level with available quantity (such as 5132) might be several ticks away. A trader leaning on such a price may then either have to wait for more quantity to become available at that price or find quantity available at a worse price. In the former case the trader would be legged and in the latter case the trader would not achieve the desired strategy price, potentially by a large number of ticks.

The leaned on quantity may become unavailable for a variety of reasons. For example, the trader that placed the order may decide to cancel the order. As another example, another trader may get their order to the exchange first and consume the available quantity at the lean level. This may occur when another trader using the same or a similar trading strategy is leaning on the same price level. As another example, if the leaned on quantity is an implied quantity, it may become unavailable due to filled or deleted orders in a tradeable object that is not part of the trading strategy.

Thus, while the conditions to lean on a particular price level according to an existing technique may be satisfied, doing so may expose a trader to unexpected risk, may not achieve the desired price for the trading strategy, and/or may leave the trader legged in one or more legs.

B. Overview of Certain Embodiments

Certain embodiments of the present invention provide techniques for lean level support for a trading strategy. According to certain embodiments, the support for a price level under consideration as a lean level is determined based at least in part on quantity available at the price level. According to certain embodiments, the support for a price level under consideration as a lean level is determined based at least in part on quantity available at one or more other price levels. According to certain embodiments, the support for a price level under consideration as a lean level is determined based at least in part on the number of orders at one or more price levels. According to certain embodiments, the lean level is determined based on the determined support.

According to certain embodiments, a lean multiplier and/or a lean base are determined dynamically based on the determined support.

Support for a price level may be represented in a variety of ways. For example, the support may be represented as a binary value: does a price level have support, "yes" or "no." As another example, the support may be represented using a simple categorization system, such as "no support," "weak support," or "strong support." As another example, the support may be represented as a parameter or weighting factor, such as a weight from 0.0 to 1.0. As another example, the support may be represented as an absolute number such as the number of orders which make up a quantity or the number of sources for an implied.

C. Support Based on Quantity at a Price Level

In certain embodiments, whether a price level has support is determined based on the quantity available at the price level. The amount of quantity to be available at the price level in determining support for the price level may be pre-defined, specified by a user, determined by a heuristic, based on the needed hedge quantity, based on historical data, or based on a user's experience or risk tolerance, for example. For example, an automated trading tool may determine that a price level with a quantity less than 5 does not have support. As another example, a user may specify that a price level with at least a quantity of 15 has support. As another example, a price level may be determined to have support when the needed quantity is less than 10% of the available quantity at the price level. As another example, if the quantity needed to be bought for the hedge leg is 10, a price level with a quantity of 11 may be determined to have no support because it has less than 120% of the needed quantity available. Alternatively, if the price level has a quantity of 100, it may be determined to have support because it has more than 120% of the needed quantity available.

Generally, the risk of leaning on a particular price level is inversely related to the quantity available at that price level. This is because when a larger quantity is available, it is more likely that an order can still be filled if a portion of the quantity available at the particular price level becomes unavailable (for example, because another order was filled at that price level first or an order making up part of the quantity available was cancelled). When a lower quantity is available, it is less likely that an order can still be filled because if that quantity becomes unavailable (again, for example, because of another order being filled or the order making up the quantity being cancelled), there may not be enough quantity left to fill the order.

As an example, with respect to FIG. 5, if a user has specified that a price level with at least a quantity of 5 has support, then price level 5134 may be determined to have support because it has a quantity of 10 available. In contrast, price levels 5124 and 5132 may be determined to have no support because they have only quantities of 1 and 2 available, respectively.

In certain embodiments, a price level is determined to have weak support based on the quantity available at the price level. Whether support is weak may be based on the particular tradeable object, tick size, and spread ratio, for example. For example, if the tick size is $6.25, the support may be stronger than if the tick size is $30, for a price level with the same quantity available because the monetary risk of missing by a few ticks is less. As another example, if there is a small multiplier for the hedge leg in the spread ratio, then a price level may have weak support if a large amount of quantity (relative to the needed quantity) is available.

D. Support when a Subsequent Price Level has No Quantity

In certain embodiments, a price level followed by one or more empty levels is determined to have no support. An empty level is a price level with no quantity available. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. For example, an automated trading tool may determine that price levels followed by two or more empty price levels do not have support. As another example, if the quantity needed to be bought for the hedge leg is 10, a price level with a quantity of 11 (extra quantity of 1) followed by an empty price level might be treated as not supported whereas the same price level might be treated as supported if it has a quantity of 100 available (extra quantity of 90).

Generally, the risk of leaning on a particular price level is lower when that price level is followed by a smaller number of empty price levels. This is because if the needed quantity cannot be filled at the particular price level (for example, because another order was filled at that price level first), the next price level with available quantity will be closer to the desired price when there are fewer empty price levels.

As an example, with respect to FIG. 5, the price level 5124 may be determined to have no support because it is followed by two empty price levels (gap 553). Alternatively, if, for example, a user has specified that a price level followed by three or more empty levels has no support, then price level 5124 may be determined to have support because gap 553 is only two price levels.

As another example, the price level 5132 may be determined to have support because it is not followed by an empty price level since price level 5134 has a quantity of 10 available. Alternatively, the price level 5132 may be determined to not have support because it is not followed by two non-empty price levels since price level 5136 is empty.

In certain embodiments, a price level followed by one or more empty levels is determined to have weak support. Whether support is weak may be based on the particular tradeable object, tick size, and spread ratio, for example. For example, if the tick size is $6.25, the support may be stronger than if the tick size is $30, for a price level followed by the same number of empty levels because the monetary risk of missing by a few ticks is less. As another example, if there is a small multiplier for the hedge leg in the spread ratio, then a price level may have weak support even though it is followed by empty price levels. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. For example, an automated trading tool may determine that price levels followed by just one empty price level have weak support.

As an example, with respect to FIG. 5, the price level 5124 may be determined to have weak support because it is followed by two empty price levels (gap 553). As another example, where support is represented as a weighting value between 0.0 and 1.0, the price level 5134 may be determined to have weak support represented by 0.25, because it is followed by three empty price levels (gap 552).

E. Support when a Subsequent Price Level has Low Quantity

In certain embodiments, a price level followed by one or more levels with low quantity is determined to have no support. That is, a price level with low quantity may be considered as providing no support. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example.

"Low" quantity may be determined based on an absolute number, a predetermined threshold, a percentage of the needed quantity, based on the available quantities at other price levels, based on an average trade size, of based on the spread ratio, for example. For example, the quantity at a price level may be considered low if it is at or below a user-specified threshold value. As another example, the quantity at a price level may be considered low if it is less than 20% of the needed quantity. As another example, the quantity at a price level may be considered low if it is less than the maximum of a predefined value and 70% of the needed quantity. As another example, the quantity at a price level may be considered low if it is less than 10% of the average quantity available at the four surrounding price levels.

Generally, the risk of leaning on a particular price level is lower when that price level is followed by a smaller number of price levels with low quantity. This is because if the needed quantity cannot be filled at the particular price level (for example, because another order was filled at that price level first), the next price level with available quantity to fill the order will be closer to the desired price when there are fewer price levels with low quantity.

With respect to FIG. 5, as an example, if a quantity of 2 or less is defined to be "low," the price level 5144 may be determined to have weak support because it is followed by a price level (5146) with a low quantity (1).

As another example, with respect to FIG. 5, if a quantity of 12 needs to be bought and if less than 50% of the desired quantity is defined to be "low," the price level 5132 may be determined to have support because it is followed by a price level (5134) that does not have low quantity (10 is more than 50% of 12).

In certain embodiments, a price level followed by one or more levels with low quantity is determined to have weak support. That is, a price level with low quantity may be considered as providing weak support. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. Having a price level with low quantity provide weak support may be used to differentiate from an empty price level that provides no support, for example.

With respect to FIG. 5, as an example, if a quantity of 2 or less is defined to be "low," the price level 5144 may be determined to have weak support because the price level 5146 has a low quantity (1).

In certain embodiments, the support for a price level may be determined based on whether one or more subsequent price levels also have sufficient quantity available to fill the needed quantity. This situation may be viewed as analogous to determining support for a price level followed by one or more price levels with low quantity where low quantity is configured to be at least the needed quantity. For example, consider a case where a hedge quantity of 5 is needed. A particular price level may be determined to have support only when the next two price levels also have sufficient quantity available to fill the needed quantity of 5, for example. A price level may be determined to have weak support when only the next price level has sufficient quantity available, for example. Alternatively, the price level may be determined to have no support when the next two price levels do not have sufficient quantity available, for example.

F. Support Based on Number of Orders

In certain embodiments, the support for a price level is determined based on the number of individual orders making up the quantity at the particular price level. The number of orders making up the quantity at the price level may be known or estimated, for example. For example, an electronic exchange may provide information about the number of orders at a particular price level. As another example, the number of orders at a particular price level may be estimated by a trading system such as an automated trading tool.

Generally, the risk of leaning on a particular price level is lower when more orders make up the quantity available at that particular price level. For example, consider a case where a hedge quantity of 5 needs to be sold and the best bid price has a quantity available of 10. Thus, it initially appears that sufficient quantity is available at the best bid price to lean on without much risk because there is twice the needed quantity available. However, this lean level becomes riskier to lean on if the quantity of 10 is from a single order of size 10 than if it quantity is from 10 orders of size 1. This is because, in the former case, the entire quantity of 10 would become unavailable if a single trader cancelled their order, for example. In the latter case, even if 5 of the traders that placed orders of size 1 decided to cancel their orders, there would still be a quantity of 5 available. Thus, the more orders that make up the quantity, the lower the risk that the quantity will not be available when the hedge order is placed.

In certain embodiments, the support for a price level is determined based on the number of individual orders making up the quantity at one or more following price levels. The number of orders making up the quantity may be known or estimated, for example. The number of levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example.

Similar to the case discussed above with respect to the number of orders that make up the quantity available at the price level being considered as a lean level, the number of orders making up the quantity at other price levels impacts the amount of support those other price levels provide. If the quantity available at a price level is made up of many orders, the price level may provide stronger support than if the quantity available is made up of few, or even a single, order.

G. Determining a Lean Level Based on Support

In certain embodiments of the present invention, a lean level to be used by the quoting leg of the trading strategy is determined based at least in part on the determined support. The support may be determined using one or more of the techniques discussed above, for example. Price levels being considered as a lean level may be examined starting at the inside market and then subsequently away from the inside market until a price level with support (or with sufficient support) is found, for example.

In certain embodiments, determining the lean level based on the determined support may use various techniques depending on how the support for a price level is represented.

For example, when support is represented as a binary value, a price level with no support may be effectively ignored in determining a lean level. Thus, the price level may be treated as if it has no quantity available for the purpose of determining a lean level. For example, with reference to FIG. 5, consider a case where a hedge quantity of 2 needs to be bought and support is represented as a binary value, either 0 (no support) or 1 (support), where a price level has support if it is followed by at most one empty price level. Thus, price level 5124, the best ask price, would be determined to have no support because it is followed by two empty price levels. Price level 5132 would be considered supported because it is not followed by an empty price level. Therefore, price level 5124 is effectively treated as having no quantity available because it has no support and price level 5132 could be determined to be the lean level because it is supported and has the needed quantity of 2 available.

As another example, when the representation of support is more complex, a price level with weak support may have only a portion of its quantity considered in determining a lean level. For example, with reference to FIG. 5, while price level 5134 has a quantity of 10 available, because it is followed by three empty price levels (gap 552), it may be determined to have weak support. Thus, in determining a lean level, only a portion of the available quantity of 10 might be counted. For example, consider a case where a hedge quantity of 5 needs to be bought and support is represented as a weighting value between 0.0 and 1.0, where the weighting is reduced by 0.2 for each subsequent empty price level. Thus, the support for price level 5124, the best ask price, might be determined to be 0.6. The support for price level 5132 might be determined to be 1.0, and the support for price level 5134 might be determined to be 0.4. In this example, the weighting factor is applied to the quantity at the price level to determine the quantity available for the purposes of determining the lean level and any fractional quantities are rounded down. Therefore, a quantity of 0 is available at 5124 (because 0.6 is rounded down to 0), a quantity of 2 is available at 5132, and a quantity of 4 is available at 5134. Since a quantity of 5 is needed, the quantity of 2 at 5132 and 3 of the available quantity of 4 at 5134 may be leaned on and thus the lean level may be determined to be the weighted average price of (2/5)(5132)+ (3/5)(5134)=5133.2.

In certain embodiments, determining the lean level based on the determined support may use dynamically adjustment of a protective mechanism such as a lean multiplier or a lean base, for example.

For example, a lean multiplier may be dynamically determined based on the support determined for a price level. When a price level has support, a smaller lean multiplier may be used, for example. When a price level has weaker or no support, a larger lean multiplier may be used, for example. The dynamic adjustment of the lean multiplier results in determining a lean level with less quantity when there is stronger support and more quantity when there is weaker support.

Similarly, as another example, a lean base may be dynamically determined based on the support determined for a price level. When a price level has support, a smaller lean base may be used, for example. When a price level has weaker or no support, a larger lean base may be used, for example. The dynamic adjustment of the lean base results in determining a lean level with less quantity when there is stronger support and more quantity when there is weaker support.

V. Example Embodiments

Figure 6:
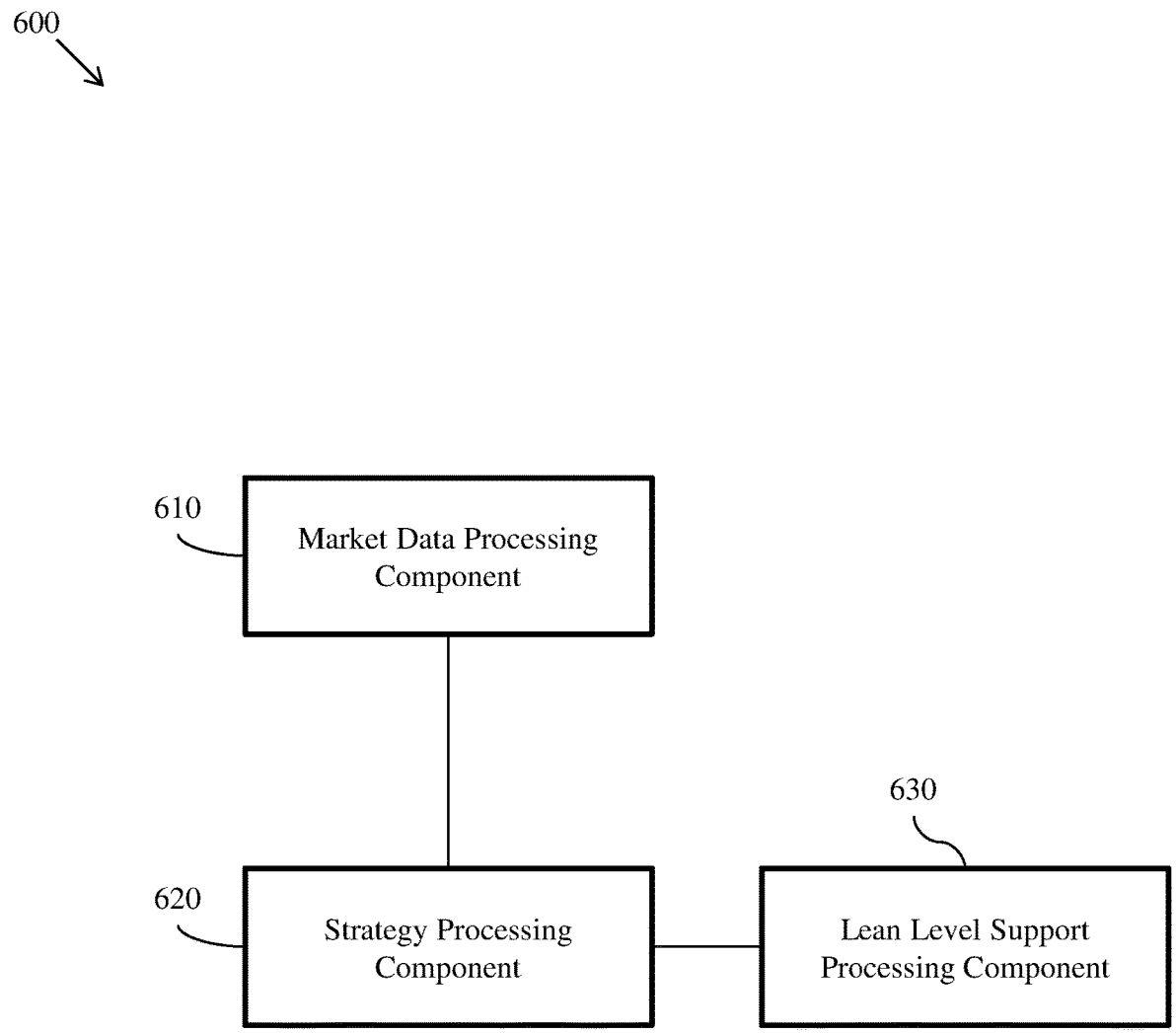
FIG. 6 illustrates a block diagram of a system for trading in an electronic trading environment according to an embodiment of the present invention.

FIG. 6 illustrates a block diagram of a system 600 for trading in an electronic trading environment according to an embodiment of the present invention. The system 600 includes a market data processing component 610, a strategy processing component 620, and a lean level support processing component 630.

The strategy processing component 620 is in communication with the market data processing component 610 and the lean level support processing component 630. In certain embodiments, the lean level support processing component 630 is in communication with the market data processing component 610.

In operation, market data for tradeable objects being traded as legs of a trading strategy is received by the market data processing component 610. The lean level support processing component 630 determines support for one or more price levels in a hedging leg of the trading strategy. The strategy processing component 620 determines a lean level for a tradeable object of the trading strategy to be quoted based on the determined support. The strategy processing component 620 then sends a quoting order based on the determined lean level.

In certain embodiments, the market data processing component 610 is part of a client device similar to the client device 110 and/or 210, discussed above. In certain embodiments, the market data processing component 610 is part of a gateway similar to the gateway 120 and/or 220, discussed above. In certain embodiments, the market data processing component 610 is part of an exchange similar to the exchange 130 and/or 230, discussed above. In certain embodiments, the strategy processing component 620 is part of a client device similar to the client device 110 and/or 210, discussed above. In certain embodiments, the strategy processing component 620 is part of a gateway similar to the gateway 120 and/or 220, discussed above. In certain embodiments, the market strategy processing component 620 is part of an exchange similar to the exchange 130 and/or 230, discussed above. In certain embodiments, the lean level support processing component 630 is part of a client device similar to the client device 110 and/or 210, discussed above. In certain embodiments, the lean level support processing component 630 is part of a gateway similar to the gateway 120 and/or 220, discussed above. In certain embodiments, the market lean level support processing component 630 is part of an exchange similar to the exchange 130 and/or 230, discussed above.

The market data processing component 610 is adapted to receive market data from an electronic exchange relating to tradeable objects traded as legs of a trading strategy. The electronic exchange may be similar to the exchange 130 and/or 230, discussed above, for example. The trading strategy may be similar to the trading strategy 310, discussed above, for example. In certain embodiments, the trading strategy is a spread.

In certain embodiments, the market data received by the market data processing component 610 includes information about quantity available at one or more price levels for a tradeable object traded as a leg of a trading strategy.

The strategy processing component 620 is adapted to receive a definition for a trading strategy. The trading strategy may be similar to the trading strategy 310, discussed above, for example. As discussed above, the definition for the trading strategy may define a relationship between two or more tradeable objects to be traded. Once defined, tradeable objects in the trading strategy may then be traded together according to the defined relationship.

The strategy processing component 620 is adapted to receive a desired strategy price. As discussed above, the desired strategy price represents the price at which to buy or sell the trading strategy. The desired strategy price may be received from a user or from an automated trading program, for example.

The strategy processing component 620 is adapted to determine a lean level based on a determined lean level support value. The lean level support value may be determined by the lean level support processing component 630 and is discussed in more detail below. The strategy processing component 620 may determine the lean level using techniques similar to those discussed above, for example.

As discussed above, once a lean level support value has been determined, a lean level to be used by the quoting leg of the trading strategy is determined based at least in part on the determined support. Price levels being considered as a lean level may be examined starting at the inside market and then subsequently away from the inside market until a price level with support (or with sufficient support) is found, for example.

In certain embodiments, determining the lean level based on the determined support may use various techniques depending on how the support for a price level is represented.

For example, when support is represented as a binary value, a price level with no support may be effectively ignored in determining a lean level. Thus, the price level may be treated as if it has no quantity available for the purpose of determining a lean level. For example, with reference to FIG. 5, consider a case where a hedge quantity of 2 needs to be bought and support is represented as a binary value, either 0 (no support) or 1 (support), where a price level has support if it is followed by at most one empty price level. Thus, price level 5124, the best ask price, would be determined to have no support because it is followed by two empty price levels. Price level 5132 would be considered supported because it is not followed by an empty price level. Therefore, price level 5124 is effectively treated as having no quantity available because it has no support and price level 5132 could be determined to be the lean level because it is supported and has the needed quantity of 2 available.

As another example, when the representation of support is more complex, a price level with weak support may have only a portion of its quantity considered in determining a lean level. For example, with reference to FIG. 5, while price level 5134 has a quantity of 10 available, because it is followed by three empty price levels (gap 552), it may be determined to have weak support. Thus, in determining a lean level, only a portion of the available quantity of 10 might be counted. For example, consider a case where a hedge quantity of 5 needs to be bought and support is represented as a weighting value between 0.0 and 1.0, where the weighting is reduced by 0.2 for each subsequent empty price level. Thus, the support for price level 5124, the best ask price, might be determined to be 0.6. The support for price level 5132 might be determined to be 1.0, and the support for price level 5134 might be determined to be 0.4.

In this example, the weighting factor is applied to the quantity at the price level to determine the quantity available for the purposes of determining the lean level and any fractional quantities are rounded down. Therefore, a quantity of 0 is available at 5124 (because 0.6 is rounded down to 0, a quantity of 2 is available at 5132, and a quantity of 4 is available at 5134. Since a quantity of 5 is needed, the quantity of 2 at 5132 and 3 of the available quantity of 4 at 5134 may be leaned on and thus the lean level may be determined to be the weighted average price of $(2/5)(5132)+(3/5)(5134)=5133.2$.

In certain embodiments, the strategy processing component 620 is adapted to determine the lean level based on the determined support using dynamically adjustment of a protective mechanism such as a lean multiplier or a lean base, for example.

For example, a lean multiplier may be dynamically determined based on the support determined for a price level. When a price level has support, a smaller lean multiplier may be used, for example. When a price level has weaker or no support, a larger lean multiplier may be used, for example. The dynamic adjustment of the lean multiplier results in determining a lean level with less quantity when there is stronger support and more quantity when there is weaker support.

Similarly, as another example, a lean base may be dynamically determined based on the support determined for a price level. When a price level has support, a smaller lean base may be used, for example. When a price level has weaker or no support, a larger lean base may be used, for example. The dynamic adjustment of the lean base results in determining a lean level with less quantity when there is stronger support and more quantity when there is weaker support.

In certain embodiments, the strategy processing component 620 is adapted to place a quoting order for a tradeable object of the trading strategy at a price determined based on the definition for the trading strategy and the desired strategy price and the determined lean level. When the quoting order is filled, the strategy processing component 620 may then place an offsetting order in a hedge leg at the determined lean level, for example.

The lean level support processing component 630 is adapted to determine a support value for a price level of a tradeable object of a hedge leg of the trading strategy. The lean level support processing component 630 may determine the support value using one or more techniques similar to those discussed above, for example. The support value may be determined base on market data received by the market data processing component 610, for example. The support value may be determined based on the strategy definition, a desired strategy price, and/or a desired strategy quantity received by the strategy processing component 620, for example.

Support for a price level may be represented in a variety of ways. For example, the support may be represented as a binary value: does a price level have support, "yes" or "no." As another example, the support may be represented using a simple categorization system, such as "no support," "weak support," or "strong support." As another example, the support may be represented as a parameter or weighting factor, such as a weight from 0.0 to 1.0. As another example, the support may be represented as an absolute number such as the number of orders which make up a quantity or the number of sources for an implied.

In certain embodiments, the lean level support processing component 630 is adapted to determine whether a price level has support based on the quantity available at the price level. The amount of quantity to be available at the price level in determining support for the price level may be pre-defined, specified by a user, determined by a heuristic, based on the needed hedge quantity, based on historical data, or based on a user's experience or risk tolerance, for example. For example, an automated trading tool may determine that a price level with a quantity less than 5 does not have support. As another example, a user may specify that a price level with at least a quantity of 15 has support. As another example, a price level may be determined to have support when the needed quantity is less than 10% of the available quantity at the price level. As another example, if the quantity needed to be bought for the hedge leg is 10, a price level with a quantity of 11 may be determined to have no support because it has less than 120% of the needed quantity available. Alternatively, if the price level has a quantity of 100, it may be determined to have support because it has more than 120% of the needed quantity available.

In certain embodiments, the lean level support processing component 630 is adapted to determine that a price level followed by one or more empty levels has no support. An empty level is a price level with no quantity available. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. For example, a price level followed by two or more empty price levels may be determined to not have support. As another example, if the quantity needed to be bought for the hedge leg is 10, a price level with a quantity of 11 (extra quantity of 1) followed by an empty price level might be treated as not supported whereas the same price level might be treated as supported if it has a quantity of 100 available (extra quantity of 90).

In certain embodiments, the lean level support processing component 630 is adapted to determine that a price level followed by one or more empty levels has weak support. Whether support is weak may be based on the particular tradeable object, tick size, and spread ratio, for example. For example, if the tick size is $6.25, the support may be stronger than if the tick size is $30, for a price level followed by the same number of empty levels because the monetary risk of missing by a few ticks is less. As another example, if there is a small multiplier for the hedge leg in the spread ratio, then a price level may have weak support even though it is followed by empty price levels. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. For example, a price level followed by just one empty price level may be determined to have weak support.

In certain embodiments, the lean level support processing component 630 is adapted to determine that a price level followed by one or more levels with low quantity is determined to have no support. That is, a price level with low quantity may be considered as providing no support. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example.

"Low" quantity may be determined based on an absolute number, a predetermined threshold, a percentage of the needed quantity, based on the available quantities at other price levels, based on an average trade size, of based on the spread ratio, for example. For example, the quantity at a price level may be considered low if it is at or below a user-specified threshold value. As another example, the quantity at a price level may be considered low if it is less than 20% of the needed quantity. As another example, the quantity at a price level may be considered low if it is less than the maximum of a predefined value and 70% of the needed quantity. As another example, the quantity at a price level may be considered low if it is less than 10% of the average quantity available at the four surrounding price levels.

In certain embodiments, the lean level support processing component 630 is adapted to determine that a price level followed by one or more levels with low quantity has weak support. That is, a price level with low quantity may be considered as providing weak support. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. Having a price level with low quantity provide weak support may be used to differentiate from an empty price level that provides no support, for example.

In certain embodiments, the lean level support processing component 630 is adapted to determine that the support for a price level is based on the number of individual orders making up the quantity at the particular price level. The number of orders making up the quantity at the price level may be known or estimated, for example. For example, an electronic exchange may provide information about the number of orders at a particular price level. As another example, the number of orders at a particular price level may be estimated based on received market data. Generally, as discussed above, the risk of leaning on a particular price level is lower when more orders make up the quantity available at that particular price level.

In certain embodiments, the lean level support processing component 630 is adapted to determine that the support for a price level is based on the number of individual orders making up the quantity at one or more following price levels. The number of orders making up the quantity may be known or estimated, for example. The number of levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. Similar to the case discussed above with respect to the number of orders that make up the quantity available at the price level being considered as a lean level, the number of orders making up the quantity at other price levels impacts the amount of support those other price levels provide. If the quantity available at a price level is made up of many orders, the price level may provide stronger support than if the quantity available is made up of few, or even a single, order.

The components, elements, and/or functionality of the system 600 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Figure 7:
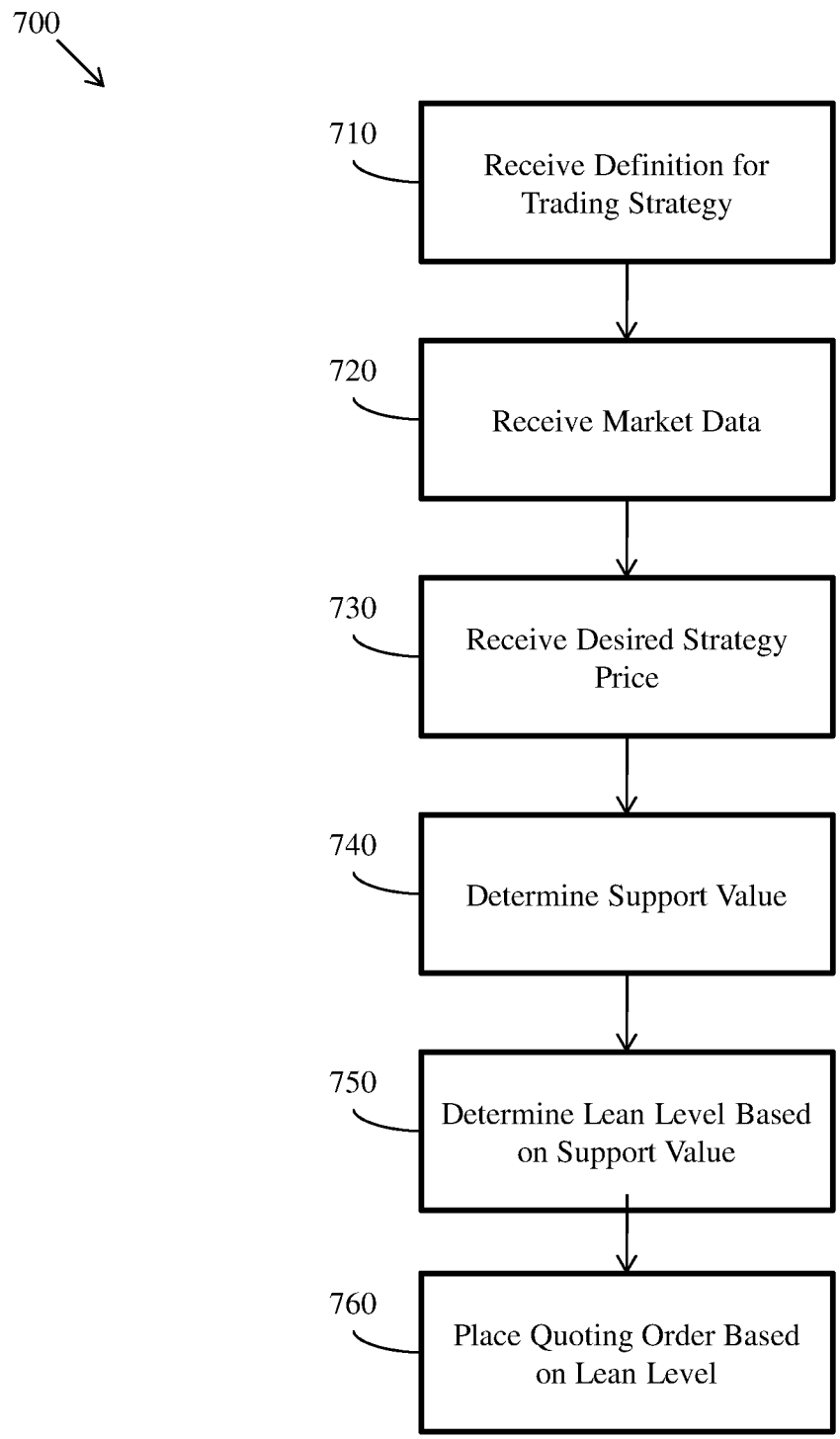
FIG. 7 illustrates a flowchart of a method for trading in an electronic trading environment according to an embodiment of the present invention.

FIG. 7 illustrates a flowchart 700 of a method for trading in an electronic trading environment according to an embodiment of the present invention. The method includes the following steps which will be described below in more detail. At step 710, a definition for a trading strategy is received. At step 720, market data is received. At step 730, a desired strategy price is received. At step 740, a support value is determined. At step 750, a lean level is determined based on a support value. At step 760, a quoting order is placed based on a lean level. The method is described with reference to elements of systems discussed above, but it should be understood that other implementations are possible.

At step 710, a definition for a trading strategy is received. The definition may be received by a strategy processing component similar to the strategy processing component 620, discussed above, for example. The trading strategy may be similar to the trading strategy 310, discussed above, for example. As discussed above, the definition for the trading strategy may define a relationship between two or more tradeable objects to be traded. Once defined, tradeable objects in the trading strategy may then be traded together according to the defined relationship.

At step 720, market data is received. The market data may be received by a market data processing component similar to the market data processing component 610, discussed above, for example. The market data may be received from an electronic exchange, for example. The electronic exchange may be similar to the exchange 130 and/or 230, discussed above, for example.

The market data may include market data relating to one or more tradeable objects that are part of a trading strategy. For example, the market data may include price and trade information for tradeable objects that are being traded by a trader as part of a spread. In certain embodiments, the received market data includes information about quantity available at one or more price levels for a tradeable object.

The trading strategy may be the trading strategy defined by the definition received at step 710, discussed above, for example. The trading strategy may be similar to the trading strategy 310, discussed above, for example. The trading strategy may include two or more legs for two or more tradeable objects, for example. The legs may be similar to the legs 320, discussed above, for example. In certain embodiments, multipliers are associated with one or more of the legs of the trading strategy. The multipliers may be similar to the multipliers 326, discussed above, for example.

At step 730, a desired strategy price is received. The desired strategy price may be received by a strategy processing component similar to the strategy processing component 620, discussed above, for example. As discussed above, the desired strategy price represents the price at which to buy or sell the trading strategy. The trading strategy may be defined by the definition received at step 710, discussed above, for example. The desired strategy price may be received from a user or from an automated trading program, for example.

At step 740, a support value is determined. The support value may be determined by a lean level support processing component similar to the lean level support processing component 630, discussed above, for example. The support value may be determined for a price level of a tradeable object of a hedge leg of the trading strategy. The support value may be determined using one or more techniques similar to those discussed above, for example. The support value may be determined base on the market data received at step 720, discussed above, for example. The support value may be determined based on a strategy definition, a desired strategy price, and/or a desired strategy quantity, for example. The strategy definition may be the strategy definition received at step 710, discussed above, for example. The desired strategy price may be the desired strategy price received at step 730, discussed above, for example.

Support for a price level may be represented in a variety of ways. For example, the support may be represented as a binary value: does a price level have support, "yes" or "no." As another example, the support may be represented using a simple categorization system, such as "no support," "weak support," or "strong support." As another example, the support may be represented as a parameter or weighting factor, such as a weight from 0.0 to 1.0. As another example, the support may be represented as an absolute number such as the number of orders which make up a quantity or the number of sources for an implied.

In certain embodiments, the support value for a price level is determined based on the quantity available at the price level. The amount of quantity to be available at the price level in determining support for the price level may be pre-defined, specified by a user, determined by a heuristic, based on the needed hedge quantity, based on historical data, or based on a user's experience or risk tolerance, for example. For example, an automated trading tool may determine that a price level with a quantity less than 5 does not have support. As another example, a user may specify that a price level with at least a quantity of 15 has support. As another example, a price level may be determined to have support when the needed quantity is less than 10% of the available quantity at the price level. As another example, if the quantity needed to be bought for the hedge leg is 10, a price level with a quantity of 11 may be determined to have no support because it has less than 120% of the needed quantity available. Alternatively, if the price level has a quantity of 100, it may be determined to have support because it has more than 120% of the needed quantity available.

In certain embodiments, the support value for a price level followed by one or more empty levels is determined to be no support. An empty level is a price level with no quantity available. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. For example, a price level followed by two or more empty price levels may be determined to not have support. As another example, if the quantity needed to be bought for the hedge leg is 10, a price level with a quantity of 11 (extra quantity of 1) followed by an empty price level might be treated as not supported whereas the same price level might be treated as supported if it has a quantity of 100 available (extra quantity of 90).

In certain embodiments, the support value for a price level followed by one or more empty levels is determined to be weak support. Whether support is weak may be based on the particular tradeable object, tick size, and spread ratio, for example. For example, if the tick size is $6.25, the support may be stronger than if the tick size is $30, for a price level followed by the same number of empty levels because the monetary risk of missing by a few ticks is less. As another example, if there is a small multiplier for the hedge leg in the spread ratio, then a price level may have weak support even though it is followed by empty price levels. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. For example, a price level followed by just one empty price level may be determined to have weak support.

In certain embodiments, the support value for a price level followed by one or more levels with low quantity is determined to be no support. That is, a price level with low quantity may be considered as providing no support. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example.

"Low" quantity may be determined based on an absolute number, a predetermined threshold, a percentage of the needed quantity, based on the available quantities at other price levels, based on an average trade size, of based on the spread ratio, for example. For example, the quantity at a price level may be considered low if it is at or below a user-specified threshold value. As another example, the quantity at a price level may be considered low if it is less than 20% of the needed quantity. As another example, the quantity at a price level may be considered low if it is less than the maximum of a predefined value and 70% of the needed quantity. As another example, the quantity at a price level may be considered low if it is less than 10% of the average quantity available at the four surrounding price levels.

In certain embodiments, the support value for a price level followed by one or more levels with low quantity is determined to be weak support. That is, a price level with low quantity may be considered as providing weak support. The number of empty levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. Having a price level with low quantity provide weak support may be used to differentiate from an empty price level that provides no support, for example.

In certain embodiments, the support value for a price level is determined based on the number of individual orders making up the quantity at the particular price level. The number of orders making up the quantity at the price level may be known or estimated, for example. For example, an electronic exchange may provide information about the number of orders at a particular price level. As another example, the number of orders at a particular price level may be estimated based on received market data. Generally, as discussed above, the risk of leaning on a particular price level is lower when more orders make up the quantity available at that particular price level.

In certain embodiments, the support value for a price level is determined based on the number of individual orders making up the quantity at one or more following price levels. The number of orders making up the quantity may be known or estimated, for example. The number of levels which follow the price level to be used in determining support for the price level may be pre-defined, specified by a user, determined by a heuristic, based on historical data, based on a user's experience or risk tolerance, or based on extra quantity available (with respect to the needed quantity for the hedge leg) at the price level, for example. Similar to the case discussed above with respect to the number of orders that make up the quantity available at the price level being considered as a lean level, the number of orders making up the quantity at other price levels impacts the amount of support those other price levels provide. If the quantity available at a price level is made up of many orders, the price level may provide stronger support than if the quantity available is made up of few, or even a single, order.

At step 750, a lean level is determined based on a support value. The lean level may be determined by a strategy processing component similar to the strategy processing component 620, discussed above, for example. The support value may be the support value determined at step 740, discussed above, for example. The lean level may be determined using techniques similar to those discussed above, for example.

As discussed above, once a lean level support value has been determined, a lean level to be used by the quoting leg of the trading strategy is determined based at least in part on the determined support. Price levels being considered as a lean level may be examined starting at the inside market and then subsequently away from the inside market until a price level with support (or with sufficient support) is found, for example.

In certain embodiments, determining the lean level based on the determined support may use various techniques depending on how the support for a price level is represented.

For example, when support is represented as a binary value, a price level with no support may be effectively ignored in determining a lean level. Thus, the price level may be treated as if it has no quantity available for the purpose of determining a lean level. For example, with reference to FIG. 5, consider a case where a hedge quantity of 2 needs to be bought and support is represented as a binary value, either 0 (no support) or 1 (support), where a price level has support if it is followed by at most one empty price level. Thus, price level 5124, the best ask price, would be determined to have no support because it is followed by two empty price levels. Price level 5132 would be considered supported because it is not followed by an empty price level. Therefore, price level 5124 is effectively treated as having no quantity available because it has no support and price level 5132 could be determined to be the lean level because it is supported and has the needed quantity of 2 available.

As another example, when the representation of support is more complex, a price level with weak support may have only a portion of its quantity considered in determining a lean level. For example, with reference to FIG. 5, while price level 5134 has a quantity of 10 available, because it is followed by three empty price levels (gap 552), it may be determined to have weak support. Thus, in determining a lean level, only a portion of the available quantity of 10 might be counted. For example, consider a case where a hedge quantity of 5 needs to be bought and support is represented as a weighting value between 0.0 and 1.0, where the weighting is reduced by 0.2 for each subsequent empty price level. Thus, the support for price level 5124, the best ask price, might be determined to be 0.6. The support for price level 5132 might be determined to be 1.0, and the support for price level 5134 might be determined to be 0.4. In this example, the weighting factor is applied to the quantity at the price level to determine the quantity available for the purposes of determining the lean level and any fractional quantities are rounded down. Therefore, a quantity of 0 is available at 5124 (because 0.6 is rounded down to 0, a quantity of 2 is available at 5132, and a quantity of 4 is available at 5134. Since a quantity of 5 is needed, the quantity of 2 at 5132 and 3 of the available quantity of 4 at 5134 may be leaned on and thus the lean level may be determined to be the weighted average price of (2/5)(5132)+(3/5)(5134)=5133.2.

In certain embodiments, the lean level is determined based on the determined support using dynamically adjustment of a protective mechanism such as a lean multiplier or a lean base, for example.

For example, a lean multiplier may be dynamically determined based on the support determined for a price level. When a price level has support, a smaller lean multiplier may be used, for example. When a price level has weaker or no support, a larger lean multiplier may be used, for example. The dynamic adjustment of the lean multiplier results in determining a lean level with less quantity when there is stronger support and more quantity when there is weaker support.

Similarly, as another example, a lean base may be dynamically determined based on the support determined for a price level. When a price level has support, a smaller lean base may be used, for example. When a price level has weaker or no support, a larger lean base may be used, for example. The dynamic adjustment of the lean base results in determining a lean level with less quantity when there is stronger support and more quantity when there is weaker support.

At step 760, a quoting order is placed based on a lean level. The lean level may be the lean level determined at step 750, for example. The quoting order may be placed by a strategy processing component similar to the strategy processing component 620, discussed above, for example.

The quoting order may be placed at a price determined based on a desired strategy price and the lean level according to a strategy definition. The strategy definition may be the definition received at step 710, discussed above, for example.

In certain embodiments, when the quoting order is filled, an offsetting order is placed in a hedge leg at the determined lean level.

One or more of the steps of the method discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system including:
   a computing device,
   wherein the computing device is configured to receive by a strategy processing component of the computing device a definition for a trading strategy, wherein the trading strategy includes a first tradeable object and a second tradeable object, wherein the strategy processing component is in communication with a market data processing component of the computing device and a lean level support processing component of the computing device;
   wherein the computing device is configured to receive by the market data processing component of the computing device from a first electronic exchange market data for the first tradeable object and a second electronic exchange for the second tradeable object, wherein the market data for the second tradeable object includes information about quantity available at each of a plurality of price levels for the second tradeable object,
   wherein the computing device is configured to receive by the strategy processing component of the computing device a desired strategy price;
   wherein the computing device is configured to determine a support value for a price level based on the received desired strategy price, wherein to determine the support value the computing device is configured to:
   iteratively determine by the lean level support processing component of the computing device, in response to determining that a first determined support value for a first price level does not satisfy a desired support value, the support value for a price level of the plurality of price levels at the second electronic exchange for the second tradeable object,
   wherein the iteratively determining starts at the inside market price level at the second electronic exchange; and
   subsequently consider each price level away from the inside market price level at the second electronic exchange until the determined support value for a first price level satisfies a desired support value,
   wherein the support value for each price level considered is determined based on a number of orders at the price level, wherein the support value is a value representing a level of risk associated with leaning on the price level;
   wherein the computing device is configured to determine by the strategy processing component of the computing device a lean level based on the determined support value; and
   wherein the computing device is configured to send by the strategy processing component of the computing device a first order message for the first tradeable object at a first price to the electronic exchange, wherein the first price is based on the definition for the trading strategy, the desired strategy price, and the determined lean level.

2. The system of claim 1, wherein the support value for a considered price level is determined based on the quantity available at the considered price level.

3. The system of claim 2, wherein the support value for a considered price level is determined based on a desired lean level quantity, wherein the desired lean level quantity is based on the definition for the trading strategy and a desired strategy quantity.

4. The system of claim 3, wherein the support value for a considered price level is determined to be a no support value when the desired lean level quantity is greater than a pre-determined percentage of the quantity available at the considered price level.

5. The system of claim 1, wherein the support value for a considered price level is determined based on the quantity available at a second price level of the plurality of price levels for the second tradeable object, wherein the second price level is different from the considered price level.

6. The system of claim 5, wherein the second price level is a subsequent price level away from the inside market from the considered price level.

7. The system of claim 5, wherein the support value for a considered price level is determined to be a no support value when the second price level has no quantity available.

8. The system of claim 5, wherein the support value for a considered price level is determined to be a weak support value when the second price level has no quantity available.

9. The system of claim 5, wherein the support value for a considered price level is determined based on a number of orders at the second price level.

10. The system of claim 5, further including instructions executable to:
   determine by the lean level support processing component of the computing device whether the second price level has low quantity available.

11. The system of claim 10, wherein the second price level is determined to have low quantity available based on a predetermined threshold.

12. The system of claim 10, wherein the second price level is determined to have low quantity available based on a desired lean level quantity, wherein the desired level quantity is based on the definition for the trading strategy and a desired strategy quantity.

13. The system of claim 10, wherein the support value for a considered price level is determined to be a no support value when the second price level has low quantity available.

14. The system of claim 10, wherein the support value for a considered price level is determined to be a weak support value when the second price level has low quantity available.

15. The system of claim 1, wherein the support value for a considered price level is determined based on the quantity available at a two or more price levels in the plurality of price levels for the second tradeable object, wherein the two or more price levels are different from the considered price level.

16. The system of claim 15, wherein the two or more price levels are subsequent price levels to the considered price level away from the inside market.

17. The system of claim 1, wherein the support value for a considered price level is determined based on a desired lean level quantity, wherein the desired lean level quantity is based on the definition for the trading strategy and a desired strategy quantity.

18. The system of claim 1, wherein the number of orders is included in the received market data.

19. The system of claim 1, wherein the number of orders is estimated.

20. The system of claim 1, wherein support values for two or more price levels in the plurality of price levels for the second tradeable object are determined, wherein the two or more price levels include the first price level.

21. The system of claim 20, wherein the lean level is determined based on the determined support values for the two or more price levels.

22. The system of claim 1, wherein the lean level is determined based on a desired lean level quantity, wherein the desired lean level quantity is based on the definition for the trading strategy and a desired strategy quantity.

23. The system of claim 1, wherein the lean level is determined based on at least one of a lean multiplier value and a lean base value.

24. The system of claim 23, wherein at least one of the lean multiplier value and the lean base value is determined based on the determined support value.

* * * * *